Figure 24:
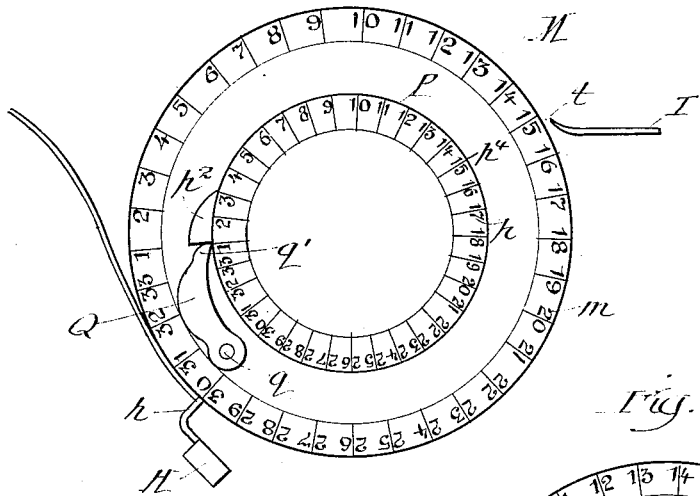

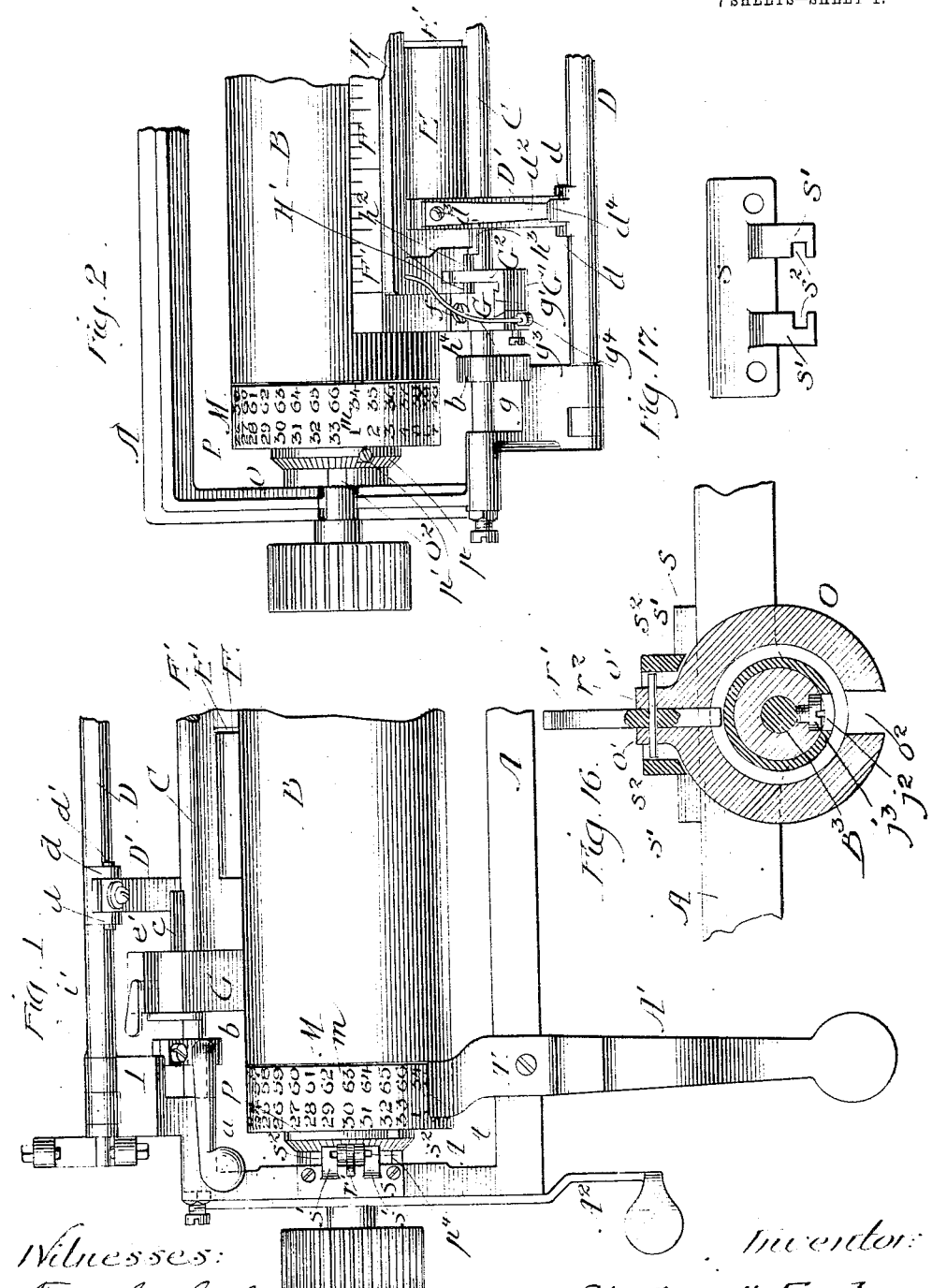

No. 884,915. PATENTED APR. 14, 1908.
S. H. FARNHAM.
TYPE WRITING MACHINE.
APPLICATION FILED DEC. 20, 1901.
7 SHEETS—SHEET 2.
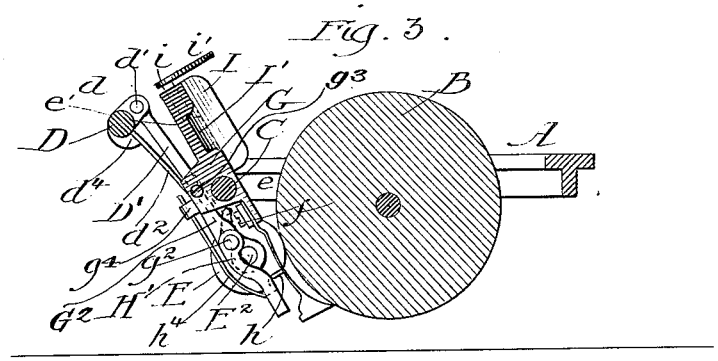
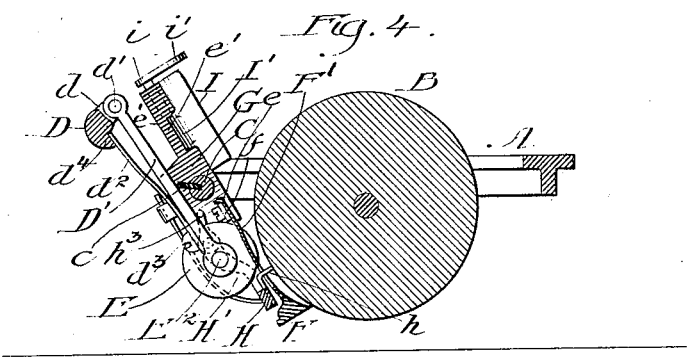
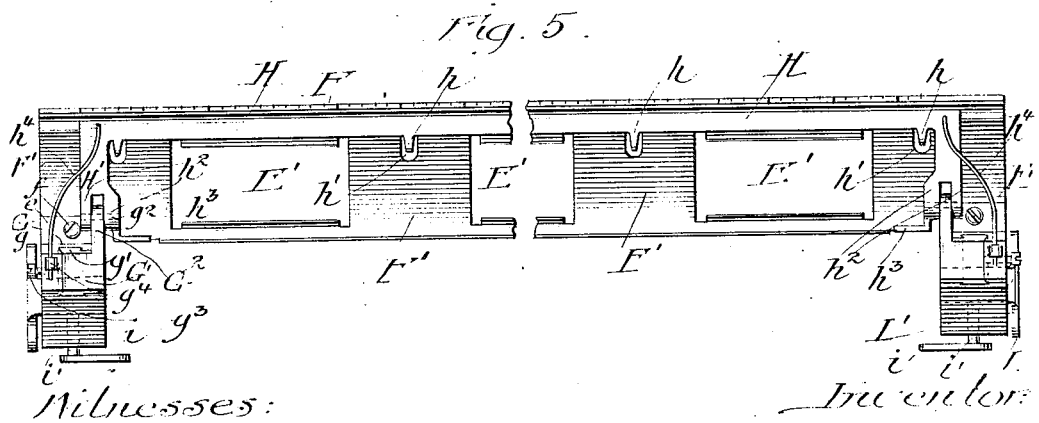
Witnesses:
Frank S. Blanchard
Oscar W. Bond
Inventor
Stephen H. Farnham
By Banning & Banning,
Attorneys.

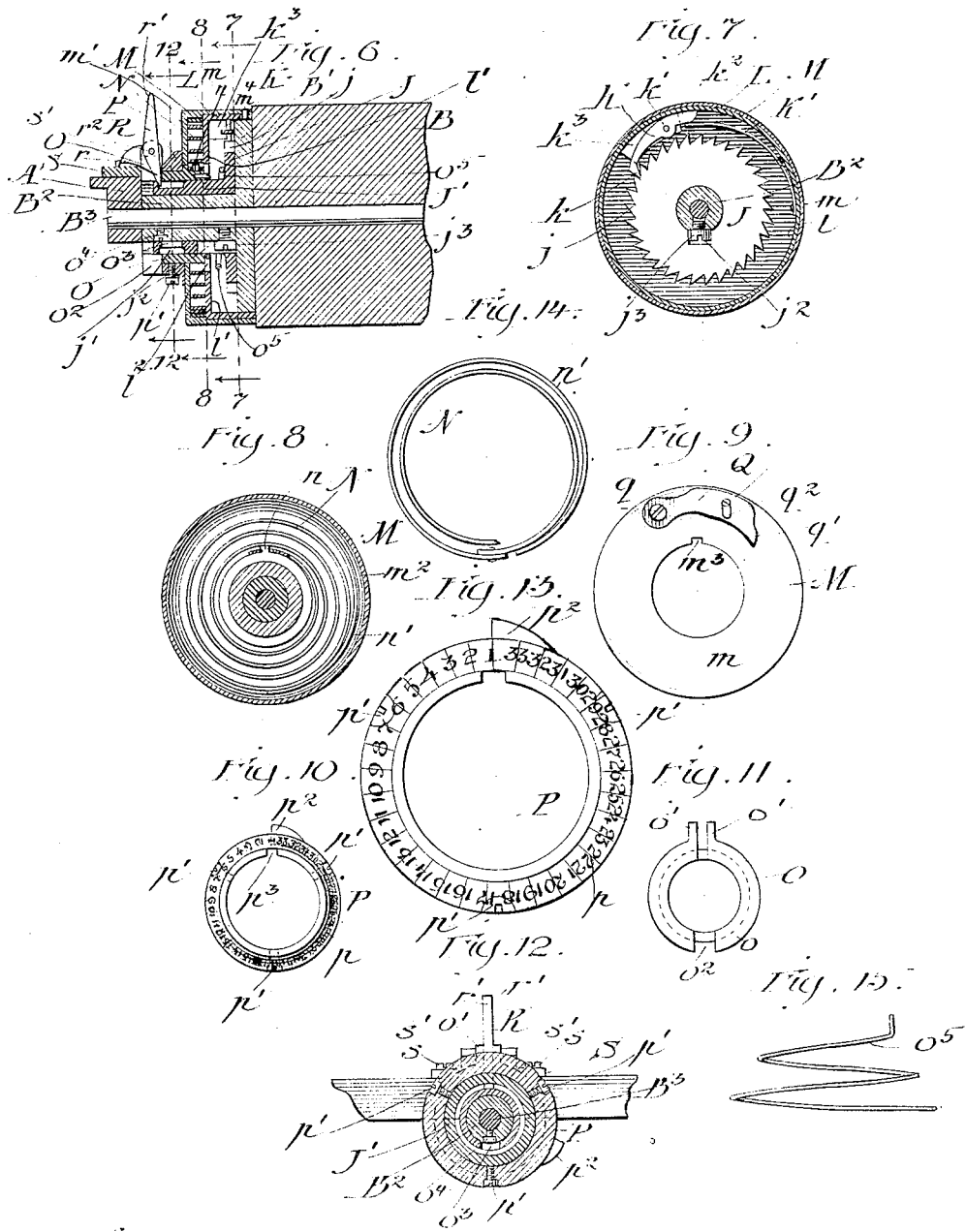

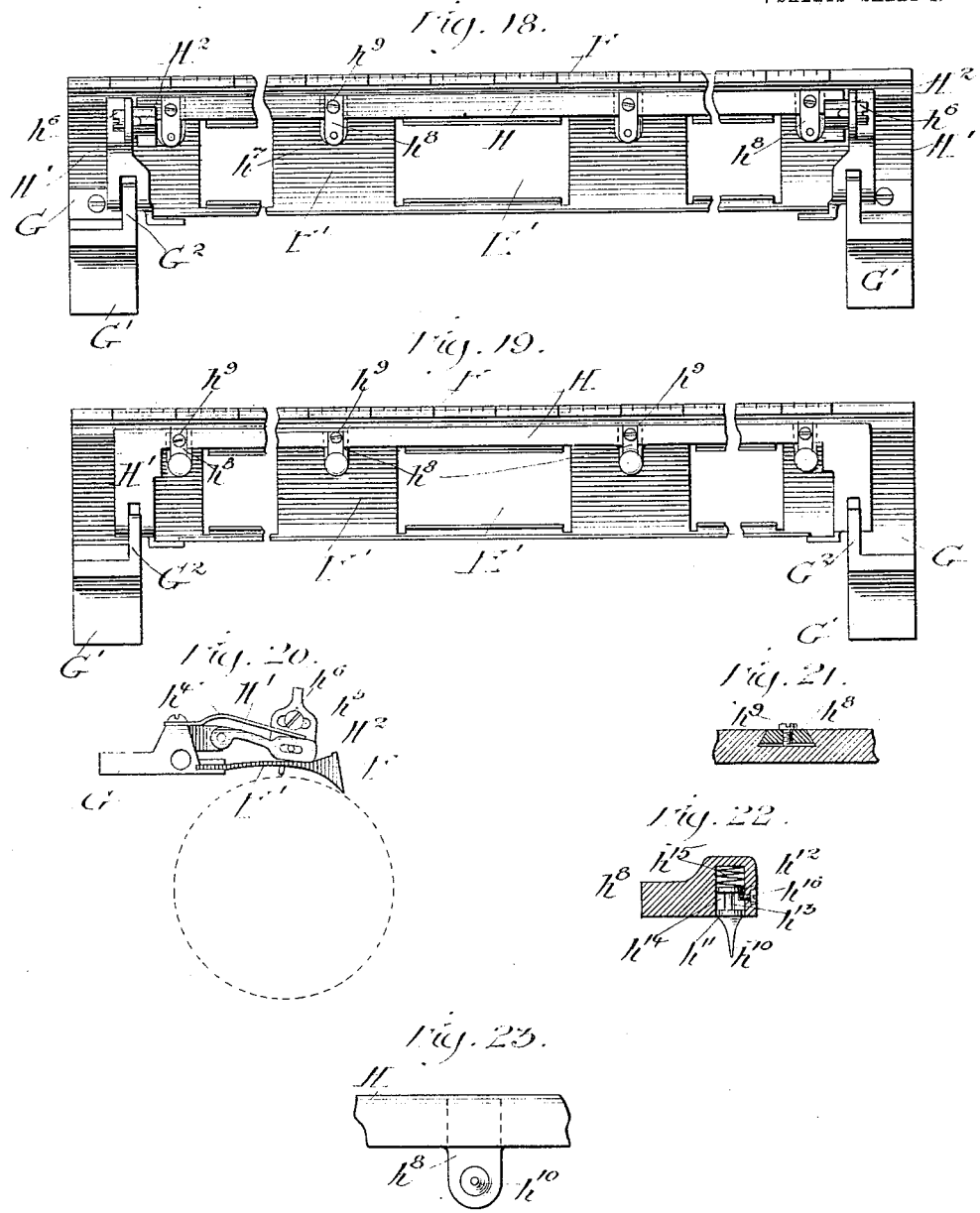

No. 884,915. PATENTED APR. 14, 1908.
S. H. FARNHAM.
TYPE WRITING MACHINE.
APPLICATION FILED DEC. 20, 1901.

7 SHEETS—SHEET 5.

Witnesses:
Frank Blanchard
Oscar W. Bond

Inventor:
Stephen H. Farnham
By Banning & Banning,
Attorneys.

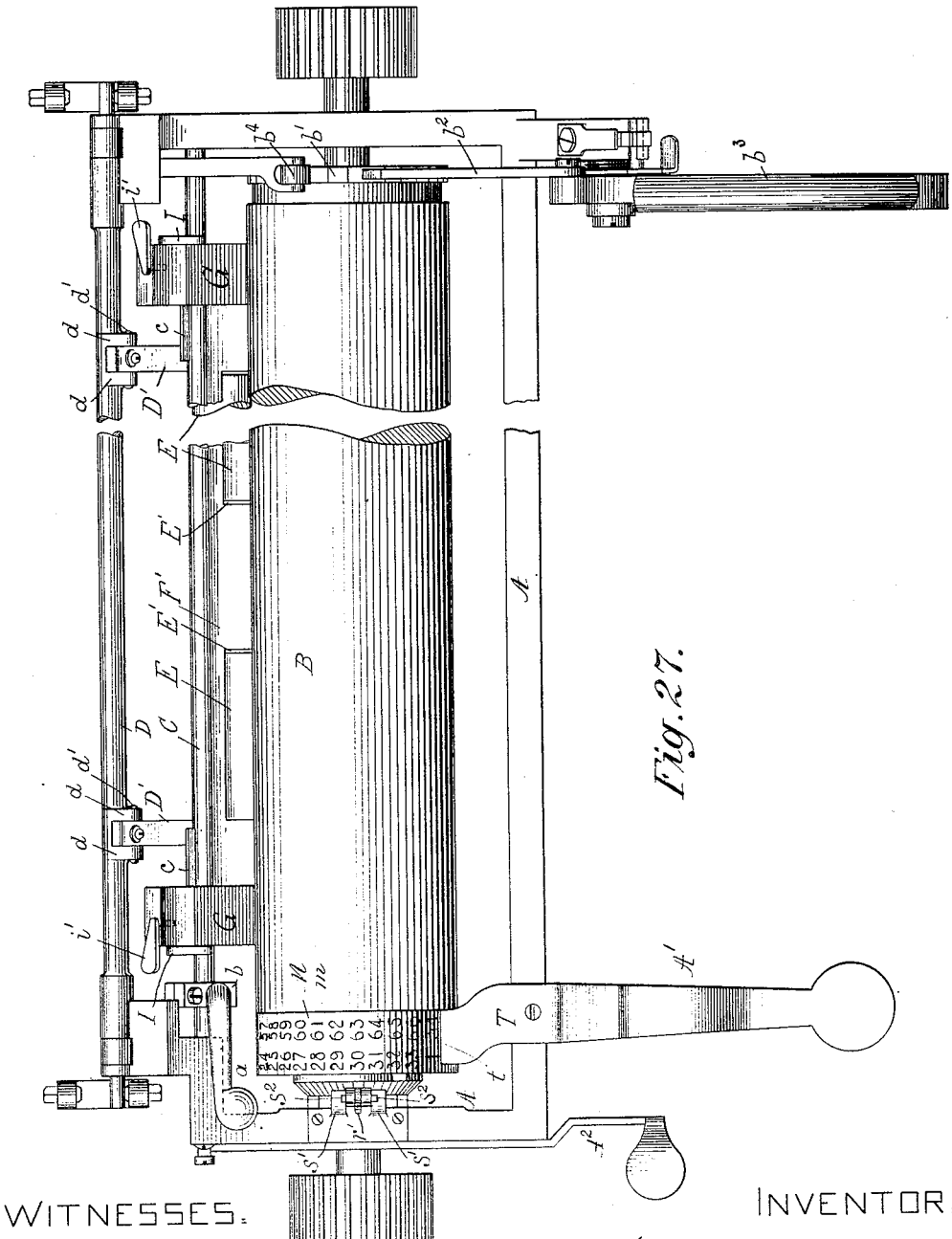

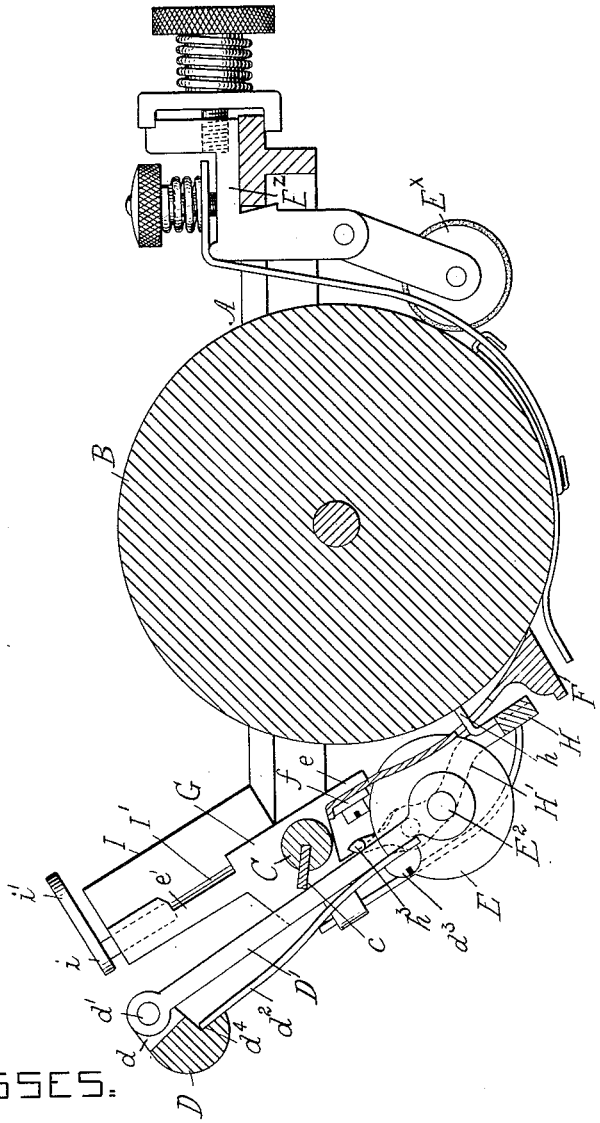

UNITED STATES PATENT OFFICE.

STEPHEN H. FARNHAM, OF CHICAGO, ILLINOIS, ASSIGNOR TO WYCKOFF, SEAMANS & BENEDICT, OF ILION, NEW YORK, A CORPORATION OF NEW YORK.

TYPE-WRITING MACHINE.

No. 884,915.        Specification of Letters Patent.        Patented April 14, 1908.

Application filed December 20, 1901. Serial No. 86,659.

*To all whom it may concern:*

Be it known that I, STEPHEN H. FARNHAM, a citizen of the United States, residing at Chicago, in the county of Cook and State of Illinois, have invented a certain new and useful Improvement in Type-Writing Machines, of which the following is a specification.

The invention relates particularly to means for facilitating the adjustment of paper in typewriting machines.

One of its objects is to provide a typewriting machine with means which will enable the operator of the machine to accurately and positively insert sheets of paper therein so that the ends of the sheets shall be horizontal, and to easily get the paper into such a position in the machine that writing may be done on a given line, or at a predetermined distance from one end of the paper, and that each line of writing shall be in a correct alinement horizontally, and which will render it convenient to fill a predetermined line or to make a correction in any line, and have the newly written matter in horizontal alinement with the remainder of the line, whether the correction is merely the insertion of a proper letter, or of any larger portion of the line.

Another object is to provide the machine with means which shall coöperate with that above mentioned and by the use of which the operator of the machine can positively and accurately determine the vertical position of any part of the writing and shall be able to properly set the paper for the commencement of a line at a predetermined point, or for correcting a line, either as to a word or words, or a letter or letters, and have the correction in proper vertical position, so that by the use of both of said means the positioning of a sheet of paper for the production of typewritten lines, commencing at predetermined points horizontally and vertically, may be quickly and easily effected, and a line may be conveniently corrected either as to a word or words or a letter or letters, so as to have the inserted correction or corrections in true alinement, both horizontally and vertically, as to the rest of the writing.

Another object is to provide, at one end of the cylinder or roller platen of a typewriting machine, means by which a predetermined line space can be selected, so as to positively insure the commencement of the writing at a predetermined line on the page, and by which the operator is enabled to select any line on the sheet and enter the paper into the machine and advance it therein until the sheet has reached a position shown by an indicating scale mark, this being the position required to bring the writing in the predetermined, selected, regular typewriter-space and line.

Another object is to obtain the positioning of a sheet of paper in a machine for line writing and corrections, mainly by mechanical means, and without the necessity of manipulating the sheets, except in inserting the sheet and advancing it by turning the cylinder or roller platen, the advance of the sheet to be continued until a predetermined or selected line is brought to the proper place to allow writing to be done in that line, said mechanical means being such that with its aid the sheet may be readily as well as accurately positioned for writing a line or making corrections in a line.

Another object is to enable the operator, by means of the mechanism to be used in horizontally positioning sheets of paper as above stated, to convert an irregular typewriter space to some regular typewriter space of the machine, so as to obtain a regular spacing after the conversion of the irregular space is effected.

Other objects also will appear in the description of the construction and operation of the mechanism constituting the invention and of the coöperative relation one to another of its several parts.

The invention consists in the features of construction, combinations and arrangements of parts, which are hereinafter described and claimed.

It is only deemed necessary to show so much of a typewriting machine as will enable the construction, application and operation of the mechanism constituting the invention to be clearly understood.

The invention may be applied to many of the well known forms of typewriting machines which include rotary platens.

Figure 25:
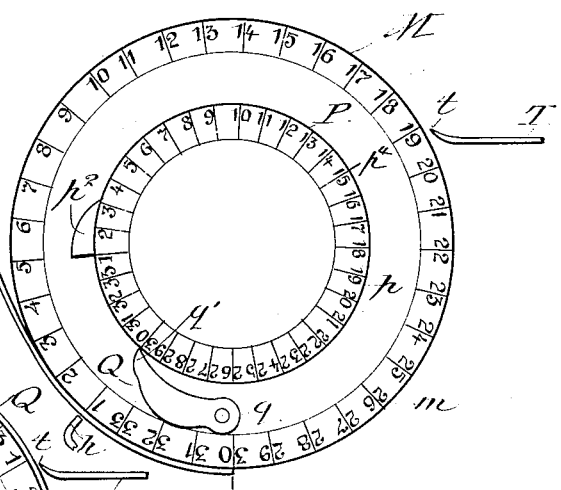
Figure 26:
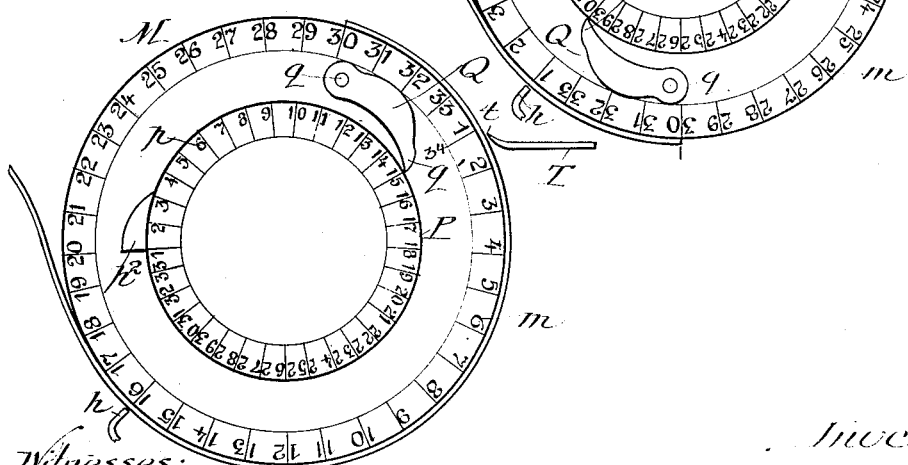

In the drawings, Figure 1 is a top or plan view showing one end of the cylinder or roller platen and its carriage frame; Fig. 2, an underside or bottom view of the parts shown in Fig. 1, showing also one end of the mechanical means or attachment for securing a positive horizontal insertion and positioning of the paper; Fig. 3, a cross-section of the cylinder or roller platen and its carriage frame, showing the means or attachment for the setting of sheets of paper correctly so that each sheet when inserted shall be horizontally positioned as to its edge, with the gage or stop pins, for stopping the insertion at a predetermined line space, retracted from the platen; Fig. 4, a view similar to Fig. 3 with the gage or stop pins, for stopping the insertion of the sheets of paper successively at a predetermined place, projected or advanced; Fig. 5, a rear view, broken away at the center, of the attachment carrying the gage or stop pins, this view showing one arrangement of the gage or stop pins and the devices by which the pins are adjusted to obtain the line and to change an irregular line space on a sheet to a regular line space, and also showing the side gage for obtaining the vertical position of the sheet; Fig. 6, a detail, in section, showing the end of the cylinder or roller platen and the devices constituting the attachment for positively selecting and obtaining a predetermined line; Fig. 7, a cross section on line 7 of Fig. 6 looking in the direction of the arrow; Fig. 8, a cross section on line 8 of Fig. 6 looking in the direction of the arrow; Fig. 9, a face view of the outer end of the cylinder or roller platen scale band or rim showing the locking dog or pawl; Fig. 10, an end face view of the graduated stop collar for stopping the circular cylinder scale band or rim at a predetermined line; Fig. 11, an end face view of the supporting sleeve or tubular bearing carrying the graduated stop ring and cylinder scale; Fig. 12, a cross section on line 12 of Fig. 6 looking in the direction of the arrow; Fig. 13, a face view enlarged of the graduated scale showing the numbered lines from 1 to 33 inclusive; Fig. 14, an edge view of the slip shoe for maintaining the return spring of the circular scale in its wound or taut condition; Fig. 15, an elevation of the conical spring for returning the ratchet disk or plate; Fig. 16, a sectional elevation through the fixed collar or tubular bearing showing the release lever or finger piece for disengaging the ratchet disk or plate; Fig. 17, a top or plan view of the supporting plate for the fixed sleeve or tubular bearing; Fig. 18, a rear view showing the horizontal letter scale and a modified construction of the bar carrying the gage or stop pins and showing also the gage or stop pins adjustable; Fig. 19, a similar view to Fig. 18 showing a modification in the attachment of the gage or stop pins to the supporting bar, showing also a modification in the construction and arrangement of the gage or stop pins; Fig. 20, an end elevation showing the construction of the bar carrying the gage or stop pins of Fig. 18; Fig. 21, a detail in section showing the attachment of the adjustable gage or stop pins of Fig. 18; Fig. 22, a detail in section showing the construction of the gage or stop pins of Fig. 19; Fig. 23, a detail which is a front view of the bar of Fig. 19 and one of the gage or stop pins of said bar; Figs. 24, 25 and 26 are diagrammatic views showing the graduated scale ring and the cylinder scale, and illustrating the adjustment of the scales and the operation in obtaining a distance of two and a half inches from the edge of a sheet of paper; Fig. 27, a plan view showing an entire platen and part of the carriage equipped with devices embodying my invention; and Fig. 28, an enlarged detail and vertical sectional view taken through the carriage.

The carriage frame A may be of the usual construction for such frames of typewriting machines; and this frame carries the cylinder or roller platen B as usual which has the usual line spacing wheel $b'$ connected thereto and with which a line spacing pawl $b^2$ coöperates, the pawl being actuated by the usual line spacing lever $b^3$. The roller platen has an end backing plate B' (Fig. 6) with an extended bearing or sleeve $B^2$, through which, and the cylinder or roller platen, passes the shaft $B^3$ mounted in suitable bearings in the end pieces of the carriage frame, so as to allow the cylinder or roller platen to be turned by the finger pieces on the projected ends of the shaft beyond the frame as usual. In the frame is pivotally mounted the usual rod C from which is suspended the scale support and the frame is arranged to be shifted from and towards the front of the machine, a rod D fixed in the rear part of the frame being connected by links with the ends of the carriage truck as usual. The rod D has thereon, near each end, ears $d$ between which is pivoted, by a pin or pivot $d'$, a hanger D', the lower ends of the hangers supporting a rod on which are mounted the rear or main rolls E, for holding a sheet of paper against the cylinder or roller platen, and feeding the sheet of paper in either direction forward or back according to the direction in which the cylinder or roller platen is turned. Forward paper feed or pressure rollers $E^x$, (Fig. 28) such as those usually employed in the No. 6 Remington machine to which I have shown my invention applied, are mounted as usual on adjustable brackets $E^z$, carried by the front cross bar of the platen frame, and are adapted to bear against the under side of the platen. Each hanger D', for the rear pressure or main paper feed rollers E, has thereon a spring $d^2$, attached to the hanger at its lower end by a rivet $d^3$ or otherwise, and having its free end in engagement with a stop or rest $d^4$ on the rod D between ears $d$ as usual, and the hanger may be forced against the tension of the spring by a wing $c$, on the rock shaft or rod C, so that by rocking the shaft or rod through the arm or lever $a$ (Figs. 1 and 27), connected to the shaft by a collar $b$ and a set screw, the wing $c$ will be made to press the hanger against the tension of the spring $d^2$ and force the feed rolls E away from the face of the cylinder or roller platen as usual. The feed rolls E are located in openings E', formed therefor in the plate or support F' which carries the scale F, and the plate support for the scale at each end is connected with a block or head G mounted on the rod or shaft C so that the scale will be supported in proper relation to the face of the cylinder or roller platen.

The head or block G has a transverse hole for mounting the block on the rod C; and on one side the head is provided with a lip $e$ for the attachment thereto, by a screw $f$, of the end of the plate support F'; and the opposite side or end of the block or head has an extension or plate $e'$ for the attachment to it of the side guide gage for maintaining and vertically positioning the sheets of paper. The under face of the body of the block or head G has therein a dovetail-groove $g$, in which is a dovetail-tongue $g'$ on the abutting face of a plate G', having an arm $G^2$ extending downwardly from the plate as shown in Fig. 5. The blocks or heads G, one at each end of the scale supporting plate (see Fig. 27), carry the bar having thereon the gage or stop-pins for registering the horizontal position of the paper. This bar H for the gage or stop pins has at each end an arm H' terminating in ears $h^2$, between which the arm $G^2$ extends for connecting the bar H to the head or block, the connection shown being a pin or pivot $g^2$ passing through the ears $h^2$ and the end of the arm $G^2$, so as to permit of a swinging movement for the bar; and as shown extending upwardly and inwardly from one of the ears $h^2$ of each arm H' is a crank arm or finger $h^3$ with which the hanger D' coöperates to control the movement of the stop bar. Thus, when the feed rollers are moved away from the platen a forward movement of the stop bar is afforded through springs $h^4$, and when the feed rollers move towards the platen, the hangers D', acting on the crank arms $h^3$ force the stop bar against the tension of the springs $h^4$, thereby forcing the leading edge stops $h$ to their inoperative positions. The gage or stop pins $h$ in the construction shown in Figs. 3, 4 and 5 are struck from the supporting bar, by forming teeth on the edge of the bar and turning the teeth at right angles to the body of the bar for the points to serve as the gage or stop pins; and as shown four gage or stop pins are provided, but a greater or smaller number could be used if so desired. Each gage or stop pin is in line with a slot or opening $h'$, cut in the body of the scale-supporting plate, and through these openings the gage or stop pins can be projected or advanced into contact with the face of the cylinder or roller platen as shown in Fig. 4. The bar as a whole is swung forward to project or advance the gage or stop pins by springs $h^4$ one at each end of the bar, each spring having its free end bearing against the rear face of the bar and being attached at its other end to a screw or an eye or loop $g^4$, on the back of the head or block G; and the forward throw of the bar, as a whole, is permitted by reason of its pivotal connection to the arm $G^2$ which allows of the necessary freedom of movement for the swing of the bar. The bar, with the gage or stop pins thereon, is raised or lowered to adjust the pins properly in relation to the cylinder or roller platen for obtaining the required horizontal position of the paper and the setting of the paper to a regular line space of the machine; and as shown in Fig. 5, the adjustment for raising and lowering the gage or stop pins is attained through the sliding plates G', the tongue of each plate sliding in its grooved recess in the head or block, and when adjusted properly each plate as shown is locked in its adjusted position by a set screw $g$ threaded into the block for its end to engage the edge of the tongue on the plate.

The adjustable bar H with its gage or stop pins constitutes the means or attachment for horizontally positioning the paper; and the adjustment of the bar upward or downward is essential, especially where the pins are fast on the bar to enable the operator of the machine to convert an irregular typewriter space to some regular typewriter space which is obtained by the line spacing mechanism $b'$, $b^2$, $b^3$, by raising or lowering the gage or stop pins as much as may be required to secure the regular typewriter space. For example, should it be desired to feed sheets of paper into the machine so that the distance from the leading edge or top of a sheet, to the line on which writing is to be done on the sheet, shall be two and a half inches plus a fraction of a line space, then in order to obtain this result with some number of regular line space movements of the platen, it is necessary to have the gage or stop pins so adjusted that when the leading edge of the sheet rests upon them the particular line along which it is desired to write on the paper shall be a whole number of line space distances from the position to which it is to be advanced by means of the line spacing mechanism, or in other words, the sheet shall then be in such a position—when its leading edge rests on the stop pins—as to render the space through which the sheet is to be fed equal to a regular line space multiplied by some whole number, or to what is herein termed a regular typewriter space. As a line space is commonly one-sixth of an inch, a line two and one-half inches from the top of the sheet would be fifteen line spaces from the top. If the stop bar were so adjusted that the leading edge of the sheet, resting on the stop pins, would be exactly four line spaces back of the printing line on the platen, then with a line space movement of nineteen line spaces the sheet would be advanced to the proper position to enable writing to be done on it on a line just two and one-half inches from its top or leading edge, for a movement of four line spaces would be required to advance the leading edge of the sheet to the printing line on the platen, and a further movement of fifteen line spaces would be required to advance a line located two and one-half inches from the leading edge of the paper, to the printing line on the platen.

Supposing the stop bar to be adjusted as described, and a sheet on which it was desired to write at two and one-half inches, plus, for example, one-eighteenth of an inch, from its leading edge, were to be inserted in the machine so that the leading edge of the paper rested on the stops of the stop bar, then the distance from the printing line to the indicated line on the paper, would be four line spaces plus one-eighteenth of an inch plus fifteen line spaces, or nineteen line spaces plus one-third of a line space. This distance would be an irregular typewriter space, for the sheet could not be fed through this distance merely by actuating the regular line spacing mechanism. But, by properly changing the adjustment of the stop bar, the distance from the printing line to the indicated line on the paper may be rendered exactly equal to a whole number of line spaces, or in other words may be converted into a regular typewriter space. This change in adjustment might be made in the case supposed either by lowering the stop bar one-third of a line space or by raising it two-thirds of a line space. Should the bar be lowered one-third of a line space then the indicated line on the paper would be exactly nineteen line spaces from the printing line, or should the bar be raised two-thirds of a line space then said indicated line would be exactly twenty line spaces from said printing line, and in either case the adjustment of the stop bar would be such as to enable the sheet to be regularly fed into the machine by means of the line spacing mechanism, so that the line on which the writing was to be done would be advanced just to the printing line. Obviously the stop bar may be adjusted upward or downward so as to produce the effect desired with respect to the positioning of the paper, by whatever fractional part of a line space an irregular typewriter space may differ from the nearest regular typewriter space.

In the use of this attachment for horizontally positioning the paper and setting the paper for regular line spaces in writing, the paper is inserted in the machine in the usual manner. The release lever $a$ is operated which rocks the shaft or rod C, and through the contact of the wings $c$ with the face of the hangers D', forces the feed rolls away from the cylinder or roller platen. The arrangement of the bar H, carrying the gage or stop pins $h$, is such, with relation to the feed rolls, that if the feed rolls are carried back or away from the cylinder or roller platen, the gage or stop pins will be projected or advanced so that the ends of the pins will pass through the slots $h'$ to and against the face of cylinder or roller platen, obstructing the feed space between the cylinder or roller platen and the scale, through which space a sheet of paper passes when it is inserted in the machine while the release lever is operating and holding back the feed rolls, with the result that the gage or stop pins will engage the entering edge of the sheet of paper and will operate to support or hold the paper in a position which will render the entering edge of the sheet parallel with the axis of the cylinder, thereby insuring the horizontal positioning of the sheet in the machine. With the return of the release lever to normal position, the gage or stop pins will be retracted or will recede at the time when the feed rolls have been advanced to initially contact with and set against and on the paper in the regular way.

The recession or retraction of the gage or stop pins, in the construction shown, depends on the engagement of the hangers D', on their return movement, with the arms or rests $h^3$, the pressure of the hangers overcoming the force of the springs $h^4$, and moving the bar H as a whole back; and this engagement of the hangers with the arms or rests occurs during the return of the feed rolls to normal position, so that when the gage or stop pins are withdrawn the paper will be caught by the feed rollers. The feed rollers, when they are thus advanced, will grip the paper to the cylinder or roller platen and will operate to hold the sheet of paper in the positive position in which it was entered in the machine, or so that the line on which writing is to be done on the paper shall be at a predetermined number of line spaces from the printing line at the under side of the platen, and so that the paper may be advanced in the usual manner through a whole number of regular typewriter spaces to the desired position.

Each block G carries a side gage for positively insuring the vertical positioning of the sheets of paper. The side guide gage is in the form of a plate I, having a tongue or neck I' projecting inwardly at right angles to the plate and entered in a recess in the plate $e'$ or extension of the head or block, as shown in Figs. 3, 4 and 5; and as shown the neck or tongue I' is of a dovetail shape and the recess therefor in the extension or plate $e'$ is likewise dovetail in shape; and when inserted the tongue or neck I' is held in its groove or recess by a set screw $i$, having a finger piece $i'$ by means of which the set screw can be turned to engage and disengage its end with and from the neck or tongue.

The side gage is adjusted to the position required, by loosening the set screw and moving the plate toward or from the head or block as necessary for the position wanted; and when the position is reached the plate is locked in its adjusted position by turning the set screw to cause its end to engage the edge of the tongue or neck. The adjustment can be easily and quickly made, only requiring the loosening of the set screw and the tightening thereof when the plate is adjusted; and when adjusted the plate furnishes a gage guide for the vertical edge of the sheet of paper when inserted, against which the edge will abut so that in all cases the sheets of paper will have the same vertical edge adjustment, thereby insuring the same regular vertical positioning for the successive sheets of paper. It will thus be seen that by means of the gage or stop pins and the side gage guide, the sheets of paper will all be positioned both horizontally and vertically in regular lines, thereby insuring a regular and positive horizontal and vertical alinement for the writing. The gage or stop pins for positively horizontally positioning assure the set of the successive sheets of paper in the same horizontal position, and also enable a correction in a line to be made, with the assurance that the correction will be in the same alinement as the rest of the line; and the side guide gage insures the setting of the successive sheets of paper in the same position vertically, and also assists in enabling a correction to be made in a line with the positive assurance that the correction will be in the proper vertical position. It will be seen that the successive sheets will have the same relative positions and that any corrections made in a line must be mechanically correct because the sheet of paper is set in the machine and passes through the machine always under the same conditions as regards horizontal and vertical positioning and alinement.

Adjacent to the plate B', at one end of the cylinder or roller platen, is located a plate or disk J having around its periphery ratchet teeth $j$, and this plate, around its axial center has a hub or tubular extension J' which is mounted on the sleeve or tubular end B² of the end plate B', so as to be free to revolve with B² and in a stationary sleeve O or tubular end as a bearing. A ratchet pawl or dog K is so arranged that its acting end $k$ normally engages the ratchet teeth of the plate or disk, and the tail or other end of the dog is engaged by the free end of a spring K', which acts to throw the acting end of the pawl inward and into engagement with the teeth, at all times, except when the plate or disk is moved endwise or axially out of engagement with the pawl or dog. The plate or disk normally acts on the pawl to turn it and the part or parts to which it is attached with the cylinder or roller platen when paper is fed into the machine. The pawl or dog K is pivotally mounted on a pin or stud $k'$ extending out from a supporting block or piece $k^3$, held in a fixed position, so that the dog is free to rock on its pin or pivot until its tail end strikes the face of the drum, and to be forced by the spring into engagement with the teeth of the ratchet plate or disk. A plate, disk, drum or short cylinder L, having as shown, a circumferential wall or rim $l$ and an end wall or plate $l'$ is slipped over the periphery of the end plate B' so as to be free to turn on the periphery as a bearing; and as shown the end wall or plate $l'$ has therein adjacent to the hub or tubular sleeve of the ratchet plate or disk a circular hole $l^2$ for clearing the outer support or tubular bearing of the hub or box of the ratchet plate or disk. A second plate, disk, drum or short cylinder M, having a circumferential wall or rim $m$ and an end wall or plate $m'$ is slipped on to the circumferential wall or rim of the drum or cylinder L and is locked thereto so as to turn therewith by a pin or key or otherwise and on the outer face of the wall or rim is a scale arranged in two rows or columns, the numerals of one row or column running from 1 to 33 and those of the other row or column from 34 to 66, the first row or column of scale marks, 1 to 33, representing one complete revolution of the cylinder or roller platen for line spacing, determined by the thirty-three teeth of the line spacing wheel $b'$, and the second row or column, 34 to 66, representing another complete revolution of the cylinder or roller platen for line spacing, the two rows or columns of scale lines or numbers representing two complete revolutions of the cylinder or roller platen.

A coiled spring N is located in the space between the end wall or plate $l'$ and the end wall or plate $m'$, within the outer drum or cylinder M. One end of this spring N is attached to a stud or pin $n$, projecting out from a fixed or stationary sleeve or tubular bearing O in which the hub or tubular extension J' slides and revolves, and the free end of the spring N bears against and is attached to one end of a sliding ring or sleeve $n'$, which is free to travel on a track $m^2$ on the inner face of the outer drum or cylinder M, the arrangement being such that the spring will always be under a tension so as to operate and return the outer drum or cylinder to a certain position which will be indicated by a scale mark and may be termed its normal position, with the result that after the spring is once wound to the tension required, it will be kept under that tension or be wound to a greater tension and rendered capable of repeatedly operating to return the outer drum or cylinder to its normal position. The ends of the slide, ring or sleeve $n'$ tend to separate from each other, and the ring exerts an outward pressure against, and constantly bears along the circumference of the ring or sleeve on its track $m^2$, and as the limit of the winding is reached, the spring N will be held in its tightly wound condition, and the ring will thereafter slip on its track, the friction between the ring and its track then preventing the spring from uncoiling or un-winding until it is released. The spring is re-wound, after each un-coiling or un-winding, with the forward rotation of the cylinder or platen, through the engagement of the ratchet plate or disk with the dog K, this dog being fixedly pivoted to the end wall or plate of the drum or cylinder L, which in turn is secured to the cylinder or drum M, so that with the turning of the cylinder or platen the drum or cylinder M is rotated forwardly, and by the frictional engagement of the pressure shoe of the spring N the spring is rewound up to the limit of its winding, making, in effect, a constantly wound spring. The release of the dog or pawl K from its rotatable disk or plate, releases the lock for the drums L and M, so that the spring N will act and give a reverse rotation to the drums or cylinders until the rotation is stopped as hereinafter described.

The sleeve or tubular bearing O has a rim $o$, and on one side the rim is cut away so as to leave an opening $o^2$ for the passage of the end of a screw driver or other tool to engage the notch of a set screw $o^4$, by means of which the hub or tubular sleeve $B^2$ is fixedly attached to the shaft or rod $B^3$; and in order to permit of access to the set screw by the screw driver or other tool, the sliding hub or sleeve J' has an opening $o^3$, which, when the ratchet plate or disk is disengaged from the pawl, comes in line with the opening $o^2$. The ratchet disk or plate is free to slide endwise on the sleeve or tubular end $B^2$, and is held against independent rotation on the sleeve or tubular end by a guide screw $j^3$, the head of which projects into a longitudinal slot $j^2$ formed in the wall or body of the hub or sleeve of the ratchet disk or plate; and near the outer end of the hub or sleeve of the ratchet disk or plate and in the outer surface thereof is a circumferential groove $j'$, for a purpose hereinafter described.

A ring P is loosely mounted on the fixed sleeve or bearing O and this ring, as shown, has an inclined upper face, on which are scale marks $p$ to the number of 33, corresponding to the number of figures of each row or column of scale lines on the drum or cylinder, M. The ring P, while loosely mounted on the fixed collar or bearing O, can be fixedly attached to the collar when adjusted so that a predetermined scale line on the ring matches or is in alinement with a positioning line $p^4$ (Fig. 1) on the rim of the fixed collar or tubular bearing; and the graduated scale ring is locked and held in its adjusted position by set screws $p'$ passing through the ring and bearing at their inner ends against the face of the fixed collar or bearing sleeve. The graduated scale ring has in its inner face a slot $p^5$ for the purpose of rendering the ring movable on the fixed collar or bearing over the projecting pin or stud $n$; and the slot $m^3$ in the end wall or plate $m'$ of the drum or short cylinder M is for the passage of the stud or pin $n$ in assembling the parts. A drop latch or dog Q is pivoted at $q$ to the end wall or plate of the drum or cylinder M, so that its acting or free end coincides with the numeral "1" of the circular scale, and this latch is so arranged that its acting end, when dropped to the position shown in Fig. 9, will strike against a stop $p^3$ on the graduated scale ring P and hold the line scale drum or cylinder M against further rotation by the spring N, whereupon the scale line No. 1 on the drum or cylinder will register with line No. 1 on the scale-ring and each of the other lines on the drum will register with the corresponding line on the ring, and the drum will be operative to indicate the position to which the paper is to be fed in the machine, so as to enable the first line to be written in a particular selected space on the sheet, as will be hereinafter explained.

The ratchet disk or plate and its hub or sleeve are moved endwise by means of a pivoted lever or finger piece R, located between ears $o'$ on the fixed collar or tubular bearing O, and supported by a pin or pivot $r^2$ passing through the ears $o'$ and the body of the lever or finger piece, and the position of the lever or finger piece is such that its acting end $r$ enters the circumferential groove $j'$ in the hub or tubular sleeve J', which groove enables the ratchet disk or plate to be rotated without interference from the acting end of the lever or finger piece. The other end $r'$ of the lever or finger piece extends above the ears and enables the operator to move the acting end of the lever or finger piece, to force the ratchet disk or plate away from the end plate B' a sufficient distance to make it clear the pawl or dog K, and when this is done the circular scale M can rotate independently of the cylinder or roller platen and can be reversely turned without interference from the ratchet disk or plate; and after release of the lever or finger piece R, the ratchet disk or plate is returned to normal position by a conically coiled spring $o^5$, located between the face of the disk or plate and the end face of the fixed collar or tubular bearing $o$. The end of the conically coiled spring fits in a hole in the end of the collar or tubular bearing, the body of the spring terminating at the attached end as shown in the circular opening $l^2$ in the wall or plate $l'$ of the drum or cylinder L, so that the spring is prevented from turning and is free to perform the office of restoring the ratchet disk or plate to its normal position.

The fixed collar or tubular bearing O is held in position by a plate S, which may be attached to the end of the carriage-frame by screws $s$ as shown or in any other suitable manner; and this plate has, extending up and inwardly from its top, fixed ears $s'$, each of which has therein a slot $s^2$; and between the ears $s'$ extend the ears $o'$ carrying the lever or finger piece R, with the pin or pivot $r^2$ projected at each end beyond the ears $o'$ and into the slots $s^2$, for the purpose of holding the parts against end movement in use. A pointer or indicator T, having a straight edge $t$, extends to the numbered scale of the drum or cylinder M. This pointer is shown attached to the front bar of the carriage frame by the same screw which attaches the lifting arm to the carriage frame, but it might be attached to the frame by other means.

The movable plate, disk, drum or cylinder, with the numbers thereon, constitutes what may be termed a circular scale, and the ring adapted to be turned and locked in an adjusted position, and having thereon lines, constitutes what may be termed a graduated scale. The circular scale in connection with the graduated scale enables the operator to select a particular line space on the paper and to so set the graduated scale that when he releases the circular scale by means of the lever or finger R and then turns the platen forward, the circular scale will indicate the arrival of the selected line space at the printing line on the platen, so that if writing is then done the line of writing will be at the desired number of line spaces from the top of the sheet of paper or in the predetermined position which may be indicated on the scale by scale-line No. 1. If, as an illustration, it is desired to have the first line of writing at a distance of two and a half inches from the top edge of a sheet of paper, and if the number of line spaces to an inch is six, which is ordinarily the case, the operator knows that fifteen regular line spaces would equal the distance of two and a half inches from the top edge of the sheet of paper, the top of the first space being at the top edge of the paper. The number of spaces from the horizontal stop or gage pins to the writing line of the cylinder is usually four regular line spaces, and as this number of spaces is to be compensated for, four spaces must therefore be added to the fifteen regular spaces to furnish the four compensating spaces required, making a total of nineteen lines as the basis of calculation. This total (nineteen) is to be deducted from thirty-four, line No. 34 being the equivalent of line No. 1 which is to be at the distance of two and a half inches from the top edge of the sheet of paper. The operator proceeds by deducting nineteen from thirty-four and obtains the remainder fifteen, which is the number of the scale line to be particularly considered in adjusting the scale to facilitate the location of the first line of the writing at a distance of two and a half inches from the top edge of the paper; he then sets the graduated scale ring so that the graduated line No. 15 is opposite the positioning line $p^4$ on the stationary or fixed collar or tubular bearing, and locks the graduated scale ring in this adjusted position; the lever or finger piece R is then actuated by the operator to release the ratchet-disk or plate from its ratchet-pawl or dog, leaving the circular scale drum or cylinder free to be given a reverse rotation, until the stop dog or latch Q comes in contact with the stop or lug $p^2$ on the graduated scale ring and stops the rotation of the circular scale drum or cylinder at the proper point to render the defining end $t$ of the pointer T even with the graduation No. 15 on the circular scale. Then, if a sheet of paper is inserted in the machine and the cylinder or roller platen is turned forward until the scale-line No. 1 is in register with the defining edge of the pointer, the paper will be in such a position that should writing be done on it the line of writing, which would be the first line, would be at the distance of two and one-half inches from the top edge of the sheet of paper, the paper having started at the pins, or end-stops, in its regular passage through the machine.

The diagrammatic Figs. 24, 25 and 26 illustrate the manner of setting the scales and inserting the sheet of paper to obtain a two and a half inch space from the top edge of the paper to the first line of writing. The graduated scale ring is set so that line 15 on the ring is opposite the positioning line $p^4$; the release of the cylinder scale allows this scale to turn backward until line 15 on this scale is even with the defining end $t$ of the pointer T, as shown in Fig. 24. The sheet of paper is inserted, with the parts as shown in Fig. 24, so that its leading edge abuts against and rests on the pins $h$; the cylinder or roller platen is then turned as usual in inserting a sheet of paper into the machine, and the advance of four line spaces brings the leading edge to the printing point on the cylinder or roller platen; and the further forward movement of the cylinder or roller platen, until "1" is at the defining end $t$ of the pointer T, carries the paper around so that the printing line on the sheet is two and a half inches, or fifteen line spaces, from the leading edge as shown in Fig. 26. If a three inch space from the top edge of the paper is desired, four is added to eighteen, making twenty-two (eighteen being the number of line spaces in a space three inches wide, and four being the number of compensating spaces), and the number twenty-two is deducted from thirty-four to obtain the number of the line by which the graduated scale-ring is to be set; the deduction shows that 12 is the number required and the operator sets the graduated scale-ring so that the graduated line No. 12 thereof is opposite the positioning line $p^4$ on the stationary or fixed collar or tubular bearing, and locks the ring in this adjusted position. The circular scale will then operate as described above. On the reverse rotation of this scale the scale line No. 12 will aline with the pointer, and when the cylinder or roller platen has been turned until the scale-line 1 registers with the defining edge of the pointer, the scale will indicate that line 1 of the writing will be at the distance of three inches from the top edge of the sheet of paper.

The gage or stop pins may be conveniently set as here described in order to convert an irregular line space on a sheet of paper to a regular line space.

The sheet of paper having been inserted in the machine in the regular way it is then adjusted both horizontally and perpendicularly so that if writing were to be done the lines would be in the desired positions on the sheet, and in so doing care must be taken that the paper is set true horizontally with respect to the cylinder or roller platen. Then the paper is turned back in the machine until the forward or lower end of the sheet is within a line space distance from the gage or stop pins, and the stop bar is adjusted as above described, so as to cause the pins to rest against that end of the paper. After this the set screws are tightened and the gage or stop pins will be set and held to horizontally position the entered sheets of paper so that any selected line thereon shall be at a regular line space distance from the printing line on the platen when they start to pass through the machine. One of the side gages only may be used in combination with the end stops, or both side gages may be so used. When both of these gages are used each of the lateral edges of a sheet of paper, when it is properly inserted in the machine, is in contact with a side gage, and the leading edge of the sheet is in contact with the end stops.

After the gage or stop pins for horizontally positioning the sheets and one or both of the side gages for perpendicularly positioning the sheets have been adjusted in their proper positions and locked, the sheets of paper inserted in the machine will be carried forward accurately in the usual way, and if a sheet of paper which has been written on is reinserted in the machine and advanced in the regular way the letters and lines of writing will be in their right places, enabling a letter or a word or a sentence or a complete line to be written over in perfect registration with the previous writing.

The cylinder of a typewriting machine when at rest is always held in some regular position by the spring detent roller $b^4$ engaging the ratchet teeth of the line spacing wheel $b'$, each regular position of the platen being such that when the platen is turned in either direction from one regular position to the next the cylindrical surface of the platen moves through a line space distance. The graduated ring may be set to render it coöperative with the circular scale in registering the predetermined position required, the cylinder of the typewriting machine being at rest, in the manner here explained.

The sheet of paper is inserted in the machine with its leading edge in contact with the gage or stop pins, the feed rolls being retracted and the gage or stop pins advanced (the pins having been previously adjusted in the manner described, if necessary to convert an irregular space into a regular space), and then the exact number of line spaces from the printing line on the platen to the predetermined position of the line to be written on the paper is ascertained. The platen and circular scale or disk are first turned by the operator and set so that scale line No. 33 is even with the defining edge of the pointer T; the paper is then fed forward through the machine in the regular way by the line spacing mechanism or by a finger wheel until the predetermined position on the paper has reached the printing point in the machine, and the operator observes the number of regular spaces required to so feed the paper into the machine, which number will then be indicated on the circular scale in the first column of figures thereon by the numeral at the defining edge of the pointer; and the circular-scale number thus indicated is deducted from thirty-four, the remainder being the number by which the graduated scale is to be set. When the graduated scale has been set so that the scale line, whose number has been ascertained as described, is even with the mark on the sleeve or tubular bearing, and the scale ring has been fastened by the set screws, this scale will be held permanently in the position it should occupy. The circular scale is then to be released, by means of the lever or finger R, and allowed to rotate until it is stopped by the contact of the dog thereon with the lug or stop of the graduated scale ring. When this has been done the circular scale will be in its normal position, and the number thereon opposite the pointer T will be the scale number by which the graduated scale ring has been set, and the difference between this number and 34 will be equal to the number of line spaces between the printing line on the platen and the leading edge of a sheet of paper resting on the end stops, plus the given number of regular spaces from the leading edge of the paper to the predetermined line on which the writing is to be begun on the sheet of paper. The paper is to be inserted in the machine, while the circular scale is in its normal position, the dog Q then being in contact with the stop $p^2$, and be fed forward in the regular way by the feed rolls until the numeral "1" of the circular scale is opposite the pointer T, when the paper will be properly located in the machine to enable line 1 of the writing to be produced at the predetermined position on the paper.

It will be seen that in setting the graduated scale and adjusting the circular scale to adapt them to indicate positively a certain regular space for the commencement of the writing, it is only required: (1) to deduct from thirty-four the number of the line spaces through which the paper must be fed to get the predetermined space on the paper at the printing line, this number having been ascertained by feeding the sheet of paper into the machine and observing the number registered by the circular scale as described; (2) to then set the graduated scale so that the number on the graduated scale equivalent to that obtained by said deduction, shall be in range with the positioning line on the fixed collar or tubular bearing; and (3) to then release the ratchet-disk or plate from its ratchet-dog or pawl, allowing the spring to act and turn the circular scale until the stop-dog or latch thereon engages the stop or lug on the graduated scale ring. When these acts have been performed, if sheets of paper are inserted in the machine with their leading edges resting on the gage or stop pins, and are fed forward through the machine in the regular way until the defining edge $t$ of the pointer registers with the scale line "1" on the circular scale, the sheets of paper will have been positively located in the predetermined position, ready for the operation of the machine.

Line 1 of the writing may, as an example, represent the first line written by the machine on a letter. If there are to be two spaces above the date line, and double spaces between the date line and the address line, and double spaces between the address line and the courtesy-line, and double spaces between the last-mentioned line and line 1 of the body of the letter, eight regular line spaces of the machine would be required above line 1. The operator having deducted eight plus four from thirty-four, (four being the number of line spaces from the faces of the pins $h$ to the printing line on the platen) he would set the graduated scale with its mark No. 22 at the mark $p^4$, and release the circular scale. Then if he should insert in the machine a sheet of paper, causing its leading edge to rest on the gage of stop-pins $h$, and should feed the sheet forward in the regular manner until line No. 28 of the circular scale was even with the defining edge of the pointer T, he would be ready to write the date. The second of the three lines preceding line No. 1 would be written when the number 30 was even with the pointer, and the third of these lines would be written when the number 32 was even with the pointer. The position of the first line of the body of the letter would be indicated by the scale-mark No. 1 on the circular scale. It will be seen that the attachment for facilitating the horizontal positioning of the sheet as described, coöperates with the circular scale and the graduated scale to render the circular scale capable of indicating a selected regular line space, which is to contain the first line of the writing, it being understood that the attachment for the horizontal positioning of the sheet of paper has been previously regulated or adjusted if necessary, to convert an irregular space into a regular space, and the graduated scale adjusted and set to positively indicate the predetermined position for line 1 of the writing.

After one or both of the side guides and the attachments for horizontally positioning the paper and for indicating a predetermined line space have been adjusted and set, the first line written on each sheet of paper may be conveniently started at a predetermined point, and spaces of the same width above the writing and lateral margins of the same width at the left of the writing may be easily obtained on all of the sheets of paper. The attachments enable an error occurring on any line of the written matter to be readily and quickly corrected; as for instance, if an error in a letter is found on the fourth line in the body of the written matter after the sheet of paper has been removed from the machine, the sheet of paper can be readily reinserted in the machine and caused to assume precisely the same position which it formerly occupied therein when the operator started to write the first line on the sheet, so that by turning the cylinder or roller platen until line No. 4 on the circular scale is even with the defining edge of the pointer, and advancing the carriage to the proper scale position for the letter, the operator will prepare to make the correction in perfect registration, both as to horizontal and vertical position, with the remainder of the line. The attachments so operate and co-act with one another as to enable an operator to pass a sheet of paper through the machine and write at any predetermined horizontal and perpendicular position desired; and to uniformly position all sheets of paper to be operated on; and to make a correction in a line of writing, or an addition to a letter, on reinserting the sheet of paper in the machine, the sheet being properly located by the aid of the stop pins and the side guide gage, and then moving the sheet forward to the desired position for the correction, or for additional matter to be written on the sheet; and such reinsertion of the sheet does not involve any special adjustment of the sheet of paper other than placing it in the machine against the horizontal gage or stop pins and the vertical side gage guide, when the proper line of the circular scale is even with the pointer.

The circular scale above described may be utilized in various classes of work which involve the backward and forward rotation of the platen, at intervals, through certain distances, for the purpose of locating different parts of the writing in their proper positions on the paper. A particular class of work involving such an operation of the platen is that which is usually termed "condensed record" work or "condensed billing". A brief description of the manner in which this scale is operated, by a person using it in doing condensed billing, will doubtless enable its use in other similar work to be well understood. Let it be supposed that the first entry on each bill sheet is to be made on a line fifteen line spaces from the top of the sheet, and that the graduated scale and circular scale are in the positions in which they are shown in Fig. 24, and that a record sheet and sheet of carbon paper are in the machine, the last entry on the record sheet being, for example, on the thirteenth line back of the end stops $h$. The operator inserts a bill sheet between the feed rolls and the carbon sheet, causing the leading edge of the bill sheet to rest on the end stops, and lets the feed rolls advance to the paper and the end stops recede therefrom. He then turns the platen so that the line numbered 1 on the circular scale moves first downward and forward and afterwards upward to the position indicated in Fig. 26, wherein this scale line is represented at the end $t$ of the fixed pointer T. He now writes the first item of the bill, and this item, for reasons above stated, will be on a line fifteen line spaces from the top of the bill sheet, or in the desired position on this sheet. The carbon copy of the item on the record sheet will be separated by two blank line spaces from the next entry above it on the record sheet, as will be understood if it is remembered that the last entry on this sheet was on the thirteenth line back of the end stops when the bill sheet was inserted in the machine. Other items may be written on the bill sheet in order and copied on the record sheet. After the last item has been written on this bill sheet, the operator advances the paper two spaces by turning the platen so as to provide for the blank space required before the next entry on the record sheet, and then he adjusts the circular scale so that scale-line No. 1 is at the end $t$ of the fixed pointer. In so adjusting the scale he may turn it forward by hand, or, if the dog Q is far enough from the stop $p^2$, he may actuate the lever R and allow the scale to turn backward to the desired position under action of the spring N. He now turns the platen backward, together with the scale, until the scale line No. 15 is at the end $t$ of the fixed pointer and when this has been done the last entry on the record sheet will be on the thirteenth line back of the end stops, and he may withdraw from the machine the bill which has been written, and insert another bill sheet and write on it and on the record sheet as above described.

The adjustment of the bar H, carrying the gage or stop pins $h$, and the construction of the bar and the attachment and adjustment of the gage or stop pins, can be varied to suit different writing machines and requirements provided the bar and pins shall be arranged to properly coöperate with the cylinder or roller platen of the machine. As shown and described, in the construction illustrated in Fig. 5, the bar H is bodily movable to raise and lower it, and the gage or stop pins are integral therewith or rigidly attached thereto.

A modification of the construction of the carrying bar H, and of the gage or stop pins and their attachment to the bar, is shown in Fig. 18. In this modification the bar H is made separate from its end pieces H', and the arms $G^2$, having the end pieces H' pivotally connected therewith, are integral or formed with the suspending heads or blocks G, by means of which the pin-carrying bar is attached to the rod C. The pin-bar H is attached adjustably to its end pieces H' by ears $H^2$, projecting from the end pieces or supports, each ear having therein a slot $h^5$ through which a fastening screw $h^6$ passes. These screws enter the ends of the bar, and when they are tightened the bar will be held in position at each end, and when they are loosened the bar can be moved upward or downward, carrying the stop pins to higher or lower positions. The stop or gage pins shown in Fig. 18, instead of being integral with or fixed to the bar H, are adjustable on the bar. Each of the pins, $h^7$, is secured at one end in an arm or bracket $h^8$, and each arm or bracket is attached to the bar by a set screw $h^9$, passing through the body of the arm or bracket and entering the body of the bar. The side edges of each arm or bracket are tapered or of a dovetail formation, and the groove or recess in the body of the bar for receiving the arm or bracket is also of a dovetail formation, as shown in Fig. 21. A firm and strong connection of each pin with the bar is thus provided and at the same time the pins are made adjustable independently of the bar, the adjustment being obtained by loosening the set screw of each arm or bracket, and moving the arm or bracket up or down as may be necessary and securing it in its new position by means of the set screw. It will be seen that in the construction of Fig. 18 the carrying bar of the gage or stop pins can be adjusted in higher or lower positions, and in addition the gage or stop pins can be independently adjusted, so that what may be termed a double adjustment of the gage or stop pins can be made. If the stop pins are made adjustable separately on the stop bar they may be easily arranged in accurate alinement with one another, so that each sheet of paper will make contact with all of the pins.

The construction shown in Fig. 19 has the bar H, carrying the gage or stop pins, and its end pieces H' formed together like the corresponding parts of the construction of Fig. 5, but the arms $G^2$, to which the end pieces of the bar are pivotally connected, are integral with the suspending heads or blocks, the same as on the arms $G^2$ in the construction of Fig. 18. This construction does not permit of the adjustment of the bar carrying the gage or stop pins. The raising and lowering of the gage or stop pins, in the construction shown in Fig. 19, depends wholly on moving the arms or brackets carrying the pins. These arms or brackets $h^8$ have bodies of the same general formation as those of the arms or brackets $h^8$ in Fig. 18, and each arm or bracket is attached to the stop bar by a set screw $h^9$. Each of the pins $h^{10}$ has a body with two disks $h^{11}$ and $h^{12}$, connected by a stem $h^{13}$. These disks are within a circular recess $h^{14}$ formed in the end of the arm or bracket $h^8$, and in the recess, between the disk $h^{12}$ and the end wall of the recess in the arm or bracket is a coiled spring $h^{15}$, which permits of a slight recession of the pin $h^{10}$ when it is forced against the cylinder or roller platen. The limit of the backward or forward movement of the pin is determined by a screw $h^{16}$ projecting into the space between the disk $h^{11}$ and $h^{12}$ as shown in Fig. 22. The arm or bracket and the recess therefor in the carrying bar H are of a dovetail formation, as shown, the same as in the construction of Fig. 18, so that when the arm or bracket is attached to the bar it will be rigid and firm with the bar. The pins are adjusted by loosening the set screw $h^9$ of each arm or bracket, and moving the arm or bracket as required to set the pin and then locking the pin with the set screw $h^9$. The yielding action of the gage or stop pins $h^{10}$ when they are forced into contact with the cylinder or roller platen, renders it easy to so adjust the stop bar as to cause all of the pins to touch the platen even if one or more of the pins should differ from the rest in length, or if the bar should not be perfectly true.

It will be seen and understood that the gage or stop pins and the pin-carrying bar can be changed as to their construction and arrangement, without departing from the nature and operation of the gage or stop pins, so long as the construction and arrangement adopted will enable the gage or stop pins to be projected across the opening or space for the paper, between the scale and the cylinder or platen, so as to form a removable blockade or obstruction against the admission of the edge of the paper beyond the gage or stop pins, thus insuring a perfect horizontal positioning of the sheets of paper when entered into the machine. The term "leading edge" (of the paper) has been used herein to designate that edge which is next to and extends lengthwise of the platen when the paper enters the machine, and which is usually at the top of the sheet after writing has been done on the paper.

While the parts which enter into the construction and operation of the invention have been described with some minuteness as to detail, it is to be understood that it is not intended to limit the invention any more than is pointed out in the claims, as the construction and arrangement of the gage or stop pins, the side guide gage, the graduated scale and the circular scale can be changed and varied to suit the character of the typewriting machine to which the devices constituting the invention may be applied.

What I claim as new and desire to secure by Letters Patent, is:—

1. In a typewriting machine, the combination with the cylinder or platen of the machine and a horizontal scale or paper retainer of an up and down adjustable gage or stop located and operating rearwardly of the horizontal scale or paper retainer for obtaining a regular line space from an irregular line space on the paper and entering the paper into the machine and positively horizontally positioning the paper in the machine, substantially as described.

2. In a typewriting machine, the combination with the cylinder or roller platen of the machine and the scale plate, of an up and down adjustable gage or stop located and operating rearwardly of the scale plate and adapted for projection through the scale plate against the face of the cylinder or roller platen for obtaining a regular line space from an irregular line space on the paper and entering the paper into the machine and positively horizontally positioning the paper in the machine, substantially as described.

3. In a typewriting machine, the combination with the cylinder or roller platen of the machine and the scale plate thereof and the feed rolls for the paper, of an up and down adjustable gage or stop adapted to be projected through the scale plate against the face of the cylinder or roller platen coincidingly and simultaneously with the recession of the feed rolls, for obtaining a regular line space from an irregular line space on the paper and entering the paper into the machine and positively horizontally positioning the paper in the machine, and means for advancing and receding the feed rolls, substantially as described.

4. In a typewriting machine, the combination with the cylinder or roller platen of the machine and the scale plate thereof and the feed rolls for the paper, of an up and down adjustable and suspended carrying bar located and operating between the scale plate and feed rolls and having thereon gage or stop pins adapted to be advanced and receded and when advanced engaging the face of the cylinder or roller platen, for obtaining a regular line space from an irregular line space on the paper and entering the paper into the machine and positively horizontally positioning the paper in the machine, substantially as described.

5. In a typewriting machine, the combination with the cylinder or roller platen of the machine and the scale plate thereof and the feed rolls for the paper, of a suspended carrying bar located and operating between the scale plate and feed rolls and having adjustable gage or stop pins thereon adapted to be advanced and receded and when advanced engage the face of the cylinder or roller platen, for obtaining a regular line space from an irregular line space on the paper and entering the paper into the machine and positively horizontally positioning the paper in the machine, substantially as described.

6. In a typewriting machine, the combination with the cylinder or roller platen of the machine and the scale plate thereof and the feed rolls, of heads or blocks having the scale plate attached thereto, a bar extending lengthwise of the scale plate and connected with the heads or blocks at each end and having gage or stop pins thereon adapted to be advanced and receded and when advanced engage the face of the cylinder or roller platen, for obtaining a regular line space from an irregular line space on the paper and entering the paper into the machine and positively horizontally positioning the paper in the machine, substantially as described.

7. In a typewriting machine, the combination with the cylinder or roller platen of the machine and the scale plate thereof and the feed rolls for the paper, of heads or blocks having the scale plate attached thereto, a bar suspended lengthwise of the scale plate and connected with the heads or blocks at each end and having gage or stop pins thereon adapted to be advanced and receded and when advanced engage the face of the cylinder or roller platen, for obtaining a regular line space from an irregular line space on the paper and entering the paper into the machine and positively and horizontally positioning the paper in the machine, and springs engaging the bar and operating to throw the bar forward, substantially as described.

8. In a typewriting machine, the combination with the cylinder or roller platen of the machine and the scale plate thereof and the feed rolls for the paper, of heads or blocks having the scale plate attached thereto, a bar extending lengthwise of the scale plate and pivotally connected with the heads or blocks at each end and having gage or stop pins thereon adapted to be advanced and receded and when advanced engage the face of the cylinder or roller platen, for obtaining a regular line space from an irregular line space on the paper and entering the paper into the machine and positively horizontally positioning the paper in the machine, a spring at each end of the bar for advancing the bar to project the gage or stop pins against the cylinder or roller platen and an arm on the bar for retracting the pins as the feed rolls initially strike the paper, substantially as described.

9. In a typewriting machine, the combination with the cylinder or roller platen of the machine and the feed rolls for the paper, of a bar extending lengthwise and below the feed rollers and having gage or stop pins thereon adapted to be advanced and receded coincident with the recession and advance of the feed rolls and when advanced with the rolls clear of the cylinder engage the face of the cylinder or roller platen for obstructing the passage of the paper and obtaining a regular line space from an irregular line space on the paper and entering the paper into the machine and positively horizontally positioning the paper in the machine, and means for advancing and receding the feed rolls, substantially as described.

10. In a typewriting machine, the combination with the cylinder or roller platen of the machine and the feed rolls for the paper, of a gage or stop for entering the paper into the machine and positively horizontally positioning the paper in the machine, the feed rolls and the gage or stop having simultaneously opposite movement in relation to each other, whereby when one is advanced to engage the paper the other will be receded to clear the paper, substantially as described.

11. In a typewriting machine, the combination with the cylinder or roller platen of the machine and the feed rolls for the paper, of a gage or stop for entering the paper into the machine and positively horizontally positioning the paper in the machine, the feed rolls and the gage or stop having a simultaneously opposite movement in relation to each other, whereby when one is advanced to engage the paper the other will be receded to clear the paper, and means for giving the feed rolls and the gage or stop their opposite movements, substantially as described.

12. In a typewriting machine, the combination with the cylinder or roller platen of the machine, of a side guide gage having a plate body and a laterally extending tongue united to the body, a carrying head into which the tongue is entered, and a set screw passing through the head and engaging the tongue, for adjusting the side gage laterally and giving a predetermined vertical or perpendicular line for the writing, substantially as described.

13. In a typewriting machine, the combination with the cylinder or roller platen of the machine, of a gage or stop for entering the paper into the machine and positively horizontally positioning the paper in the machine, and a side guide gage laterally adjustable for entering the paper into the machine and positively vertically positioning the paper in the machine, the two gages operating to set and position the paper positively both horizontally and vertically in the machine, substantially as described.

14. An attachment for positively horizontally positioning sheets of paper in a typewriting machine, comprising an adjustable gage or stop, adapted for suspension on the machine to coöperate with the cylinder or roller platen thereof rearwardly of a horizontal scale or paper retainer bar and limit the passage of the paper initially into the machine, in combination with a horizontal scale or paper retainer, substantially as described.

15. An attachment for positively horizontally positioning sheets of paper in a typewriting machine, comprising an adjustable gage or stop, adapted for suspension in coöperative relation with the cylinder or roller platen of the machine rearwardly of a horizontal scale or paper retainer bar and to be projected against the face of the cylinder or roller platen, in combination with a horizontal scale or paper retainer, substantially as described.

16. An attachment for positively horizontally positioning sheets of paper in a typewriting machine, comprising a carrying bar adapted for suspension in coöperative relation with the cylinder or roller platen of the machine rearwardly of a horizontal scale or paper retainer and having thereon adjustable gage or stop pins, advanced and receded in correlation to the cylinder or roller platen, and when advanced engaging the face of the cylinder or roller platen, for obtaining a regular line space from an irregular line space on the paper, in combination with a horizontal scale or paper retainer, substantially as described.

17. An attachment for positively horizontally positioning sheets of paper in a typewriting machine, comprising a scale plate, a suspended bar located and operating rearwardly of the scale and having thereon gage and stop pins adapted to be advanced and receded, and heads or blocks carrying the scale plate and the bar and its gage or stop pins and adapted for attachment to the machine, for suspending the scale plate and bar and its gage or stop pins in proper coöperative relation with the cylinder or roller platen of the machine, substantially as described.

18. In a typewriting machine, the combination with the cylinder or roller platen of the machine, of a circular scale indicating regular line spaces and located at one end of and revoluble independently or in unison with the cylinder or roller platen, and a graduated scale adjustably mounted and held when adjusted in a fixed relation and coöperating with and furnishing a stop for the circular scale, for obtaining a selected predetermined line space, substantially as described.

19. In a typewriting machine, the combination with the cylinder or roller platen of the machine, of an endwise slidable ratchet plate or disk at the end of the cylinder or platen, a pawl or dog engaging the ratchet plate or disk, and a number scale having the pawl or dog fixedly pivoted thereto and indicating regular typewriting spaces of the machine and reversely turnable independently of the cylinder or roller platen with the release of the ratchet plate or disk from the pawl or dog, substantially as described.

20. In a typewriting machine, the combination with the cylinder or roller platen of the machine, of an endwise slidable ratchet plate or disk, a pawl or dog engaging the ratchet plate or disk, a number scale having the pawl or dog fixedly pivoted thereto and indicating regular typewriting spaces of the machine and reversely turnable independently of the cylinder or roller platen with the release of the ratchet plate or disk from the pawl or dog, a graduated scale adapted to be positioned and locked in position, and a stop on the graduated scale for stopping the turning of the number scale at the predetermined line indicated by the graduated scale, substantially as described.

21. In a typewriting machine, the combination with the cylinder or roller platen of the machine, of an endwise slidable ratchet plate or disk, a pawl or dog engaging the ratchet plate or disk, a number scale having the pawl or dog fixedly pivoted thereto and indicating regular typewriting spaces of the machine, and reversely turnable independently of the cylinder or roller platen with the release of the ratchet plate or disk from the pawl or dog, a graduated scale adapted to be positioned and locked in position, and a stop on the graduated scale for stopping the turning of the number scale at the predetermined line indicated by the graduated scale, and a spring for giving the number scale its reverse turning, substantially as described.

22. In a typewriting machine, the combination with the cylinder or roller platen of the machine, of an endwise slidable ratchet plate or disk, a pawl or dog engaging the ratchet plate or disk, a number scale having the pawl or dog fixedly pivoted thereto and indicating regular typewriting spaces of the machine and reversely turnable independently of the cylinder or roller platen with the release of the ratchet plate or disk from the pawl or dog, a graduated scale adapted to be positioned and locked in position, and a stop on the graduated scale for stopping the turning of the number scale at the predetermined line indicated by the graduated scale, and a spring for giving the number scale its reverse turning, and a conical coiled spring for returning the ratchet plate or disk to normal position for engagement by its pawl or dog, substantially as described.

23. In a typewriting machine, the combination with the cylinder or roller platen of the machine, of an endwise slidable ratchet plate or disk, a pawl or dog engaging the ratchet plate or disk, a conical coiled spring for returning the ratchet plate or disk to normal position, a lever or finger piece for endwise moving the ratchet plate or disk, a number scale having a pawl or dog fixedly pivoted thereto and encircling the ratchet plate or disk, a spring for reversely turning the number scale when the ratchet plate or disk is released from its pawl or dog, and a support for the sliding ratchet plate or disk, substantially as described.

24. In a typewriting machine, the combination with the cylinder or roller platen of the machine, of an endwise slidable plate or disk, a pawl or dog engaging the ratchet plate or disk, a number scale having the pawl or dog fixedly pivoted thereto and indicating regular typewriting spaces of the machine encircling the ratchet plate or disk, a coiled spring having one end attached to a fixed support and the other end attached to a slipping shoe operating on the number scale for reversely turning the number scale with the release of the ratchet plate or disk from its pawl or dog, substantially as described.

25. In a typewriting machine, the combination of a number scale indicating regular typewriting spaces of the machine, a graduated scale adapted to be positioned and set in its adjusted position, a stop between the number scale and the graduated scale, and means for releasing the number scale to reversely turn and stop at a number coinciding with the set number of the graduated scale, substantially as described.

26. In a typewriting machine, the combination with two parts one of which is movable of a slipping shoe bearing on one of said parts, and a coiled spring which is attached at one end to one of said two parts and at the other end to said shoe and which is constantly under tension, said movable part being operative to wind the spring.

27. In a typewriting machine, the combination of a gage or stop for horizontally positioning the sheets of paper in the machine, a number scale indicating regular typewriting spaces of the machine, and a graduated scale for positioning the number scale to a predetermined line of writing, substantially as described.

28. In a typewriting machine, the combination of a gage or stop for horizontally positioning the paper in the machine, means for adjusting and setting the gage or stop, a number scale indicating regular typewriting spaces of the machine, means for reversely turning the number scale, a graduated scale, and means for positioning the graduated scale and stopping the number scale at the position line of the graduated scale, substantially as described.

29. In a typewriting machine, the combination of a gage or stop for horizontally positioning the paper in the machine, means for adjusting and setting the gage or stop, a number scale indicating regular typewriting spaces of the machine, means for reversely turning the number scale, a graduated scale, means for positioning the graduated scale and stopping the number scale at the position line of the graduated scale, and a side guide gage for positioning the paper perpendicularly, substantially as described.

30. In a typewriting machine, the combination of a horizontal scale or paper retainer, a gage or stop located and operating rearwardly of the horizontal scale or paper retainer for horizontally positioning the paper in the machine, and a circular scale revoluble independently or in unison with the cylinder or roller platen and indicating regular typewriting line spaces of the machine, substantially as described.

31. In a typewriting machine, the combination of a horizontal scale or paper retainer, an adjustable gage or stop located and operating rearwardly of the horizontal scale or paper retainer for horizontally positioning the paper in the machine, and a circular scale revoluble independently or in unison with the cylinder or roller platen and indicating the regular typewriting spaces of the machine, substantially as described.

32. In a typewriting machine, the combination of a gage or stop for horizontally positioning the paper in the machine, a side gage guide perpendicularly positioning the paper in the machine and a circular scale indicating regular typewriting spaces of the machine, substantially as described.

33. In a typewriting machine, the combination of an adjustable gage or stop for horizontally positioning the paper in the machine, an adjustable side gage guide for perpendicularly positioning the paper and a circular scale indicating regular typewriting spaces of the machine, substantially as described.

34. An attachment for obtaining a predetermined regular line space on a typewriting machine, comprising a circular number scale indicating the regular line spaces of the machine and revoluble independently or in unison with the cylinder or roller platen of the machine, and a graduated scale adapted to be positioned for the predetermined line space and set in its adjusted position for cooperating with the circular number scale, substantially as described.

35. An attachment for obtaining a predetermined regular line space of a typewriting machine, comprising a circular number scale indicating the regular line spaces of the machine, an endwise slidable ratchet plate or disk, a pawl or dog engaging the ratchet plate or disk, and a graduated scale adapted to be positioned for the predetermined line space and set in its adjusted position, substantially as described.

36. An attachment for obtaining a predetermined regular line space of a typewriting machine, comprising a circular number scale indicating the regular line spaces of the machine, an endwise slidable ratchet plate or disk, a pawl or dog engaging the ratchet plate or disk, a coiled spring for actuating the circular number scale in one direction and a graduated scale adapted to be positioned for the predetermined line space and set in its adjusted position, substantially as described.

37. An attachment for obtaining a predetermined regular line space of a typewriting machine, comprising a circular number scale indicating the regular line spaces of the machine, an endwise slidable ratchet plate or disk, a pawl or dog engaging the ratchet plate or disk, a finger piece for moving the ratchet plate or disk endwise, a conical coil spring for returning the ratchet plate or disk to normal position, a coiled spring for actuating the circular number scale in one direction and a graduated scale adapted to be positioned for the predetermined line space and set in its adjusted position, substantially as described.

38. An attachment for obtaining a predetermined regular line space of a typewriting machine, comprising a circular number scale indicating the regular line spaces of the machine, an endwise slidable ratchet plate or disk, a pawl or dog engaging the ratchet plate or disk, a finger piece for moving the ratchet plate or disk endwise, a conical coil spring for returning the ratchet plate or disk to normal position, a sleeve or tubular bearing in which the ratchet plate or disk is endwise slidable, a plate for attaching the sleeve or tubular bearing to the machine, a coiled spring for actuating the circular number scale in one direction, a slipping shoe carrying one end of the last mentioned spring, and a graduated scale adapted to be positioned for the predetermined line space and set in its adjusted position, substantially as described.

39. An attachment for obtaining a predetermined regular line space of a typewriting machine comprising a circular scale indicating the regular line spaces of the machine, an endwise slidable ratchet plate or disk, a pawl or dog engaging the ratchet plate or disk, a sleeve or tubular bearing in which the ratchet plate or disk slides endwise, a plate attaching the sleeve or tubular bearing to the machine, ears on the plate each ear having a vertical slot therein, a finger piece pivotally mounted on the sleeve or tubular bearing for its pivot to enter the vertical slots of the ears of the attaching plate, and a graduated scale adapted to be positioned for the predetermined line space and set in its adjusted position on the sleeve or tubular bearing, substantially as described.

40. In a typewriting machine, the combination with a printing platen and a scale or paper retainer bar rearwardly of the printing line of the platen, of a gage or stop adjacent to the scale or paper retainer bar, normally out of contact with the platen and adapted to be moved into engagement with the surface of the platen and furnish a horizontal position rest for the leading edge of an entered sheet of paper, substantially as described.

41. In a typewriting machine, the combination with a platen and a feed for entering the paper into the machine, of a gage or stop located and operating rearwardly of the printing line of the platen and forwardly of the bite of the feed, normally out of contact with the platen and adapted to be moved into engagement with the platen and furnish a horizontal position rest for the leading edge of a sheet of paper entered into the machine, substantially as described.

42. In a typewriting machine, the combination with a platen, a scale or paper retainer bar, and a feed device for the sheets of paper, of a gage or stop located and operating between the scale or paper retainer bar and the feed device, normally out of contact with the surface of the platen and adapted to be moved into engagement with the platen and furnish a horizontal position rest for the leading edge of a sheet of paper entered into the machine, substantially as described.

43. In a typewriting machine, the combination with a platen and a feed roll for entering sheets of paper into the machine, of a gage or stop operative rearwardly of the printing line of the platen and forwardly of the bite of the feed roll, normally out of contact with the surface of the platen and adapted to be moved into engagement with the platen and furnish a horizontal position rest for the leading edge of the sheet of paper after passing the plane of the bite of the feed roll of the platen, substantially as described.

44. In a typewriting machine, the combination of a platen, a platen carriage, and a gage or stop suspended from the rear side of the carriage and normally out of contact with the surface of the platen and adapted to be moved into engagement with the platen and furnish a horizontal position rest for the leading edge of a sheet of paper entered into the machine, substantially as described.

45. In a typewriting machine, the combination of a platen, a platen carriage, a feed device for entering the sheets of paper into the machine, and a gage or stop suspended from the rear of the carriage and operative between the feed device and the printing line or center of the platen and normally out of contact with the surface of the platen and adapted to be moved into engagement with the platen and furnish a horizontal position rest for the leading edge of a sheet of paper entered into the machine, substantially as described.

46. In a typewriting machine, the combination of a coiled spring fixedly attached at one end, a circular shoe, consisting of a split ring having an outward pressure, and a continuous track for the shoe, for rewinding and maintaining the spring in its wound condition, substantially as described.

47. In a typewriting machine, the combination of a platen, a fixed apertured paper apron, a paper stop which is adapted to be projected through an apertured portion of the paper apron and into the path of the leading edge of the paper, and hand operated means for affording a movement of the paper stop into and out of the path of the leading edge of the paper and into and out of contact with the platen.

48. In a typewriting machine, the combination of a platen, a paper feeding device which coöperates therewith, means for moving said paper feeding device into and out of coöperative relation with the platen, a paper stop independent of the paper feeding device, and means for moving the paper stop into the path of the leading edge of the paper and into contact with the platen when the paper feeding device is moved out of coöperative relation with the platen.

49. In a typewriting machine, the combination of a platen, paper feed rollers which coöperate therewith, means for moving said paper feed rollers into and out of contact with the platen, a paper stop, and means for moving the paper stop into the path of the leading edge of the paper and into contact with the platen when the paper feed rollers are moved out of contact with the platen.

50. In a typewriting machine, the combination of a platen, an apertured paper apron, paper feed rollers which pass through apertured portions of the paper apron and which coöperate with the platen, means for moving said paper feed rollers into and out of contact with the platen, a paper stop, and means for automatically moving the paper stop into the path of the leading edge of the paper and into contact with the platen when the paper feed rollers are moved out of contact with the platen.

51. In a typewriting machine, the combination of a platen, paper feeding rollers which coöperate therewith, means for moving said paper feed rollers into and out of contact with the platen, an apertured paper apron, a paper stop, and means for projecting the paper stop through an apertured portion of the paper apron and into the path of the leading edge of the paper when the feed rollers are moved out of contact with the platen.

52. In a typewriting machine, the combination of a platen, spring pressed paper feeding rollers which coöperate therewith, hand operated spring restored means for moving said paper feed rollers into and out of contact with the platen, an apertured paper apron, a plurality of paper stops, and means controlled by the movement of the hand operated moving means for projecting the paper stops through apertured portions of the paper apron and into the path of the leading edge of the paper when the feed rollers are moved out of contact with the platen.

53. In a typewriting machine, the combination of a platen, a paper feeding device, means for moving said paper feeding device into and out of contact with the platen, a paper stop, means controlled by said moving means for moving said paper stop into the path of the leading edge of the paper when the said feeding device is moved out of contact with the platen, and means for adjusting said stop relatively to its moving means.

54. In a typewriting machine, the combination of a platen, paper feed rollers which coöperate therewith, means for moving said paper feed rollers into and out of contact with the platen, a paper stop, means for moving the paper stop into the path of the leading edge of the paper and into contact with the platen when the paper feed rollers are moved out of contact with the platen, and means for adjusting said stop relatively to its moving means.

55. In a typewriting machine, the combination of a platen, an apertured paper apron, paper feed rollers which pass through apertured portions of the paper apron and which coöperate with the platen, means for moving said paper feed rollers into and out of contact with the platen, a paper stop, means for automatically moving the paper stop into the path of the leading edge of the paper and into contact with the platen when the paper feed rollers are moved out of contact with the platen, and means for adjusting said stop relatively to its moving means.

56. In a typewriting machine, the combination of a platen, spring-pressed paper feeding rollers which coöperate therewith, hand-operated means for moving said paper feed rollers into and out of contact with the platen, an apertured paper apron, a plurality of paper stops, means controlled by the movement of the hand operated moving means for projecting the paper stops through apertured portions of the paper apron and into the path of the leading edge of the paper when the feed rollers are moved out of contact with the platen, and means for adjusting said paper stops relatively to their moving means.

57. In a typewriting machine, the combination of a platen, paper feed rollers, a rock shaft, means for turning said rock shaft, means carried by said rock shaft for moving said feed rollers out of contact with the platen, and a paper stop movable simultaneously with the rock shaft and adapted to be projected into the path of the leading edge of the paper when the shaft is turned to move the feed rollers out of contact with the platen.

58. In a typewriting machine, the combination of a platen, paper feed rollers, spring pressed arms which carry said feed rollers, a rock shaft, hand operated means for turning said rock shaft, means carried by said rock shaft for moving said arms against their spring tension and thereby moving the feed rollers out of contact with the platen, and a plurality of paper stops movable simultaneously with the rock shaft, and adapted to be projected into the path of the leading edge of the paper when the shaft is turned to move the feed rollers out of contact with the platen.

59. In a typewriting machine, the combination of a platen, paper feed rollers, a rock shaft, means for turning said rock shaft, means carried by said rock shaft for moving said feed rollers out of contact with the platen, arms movable simultaneously with said rock shaft, paper stops carried by said arms and adapted to be projected into the path of the leading edge of the paper when the shaft is turned to move the feed rollers out of contact with the platen, and means for adjusting the stops on said arms.

60. In a typewriting machine, the combination with a revoluble platen, of pressure rollers bearing against the under side of the platen, a gage forward of said rollers and below the center of the platen and normally separated from the latter, means for releasing said rollers, and means for causing an upward movement of said gage to the platen.

61. In a typewriting machine, the combination with a platen, of a gage for squaring the leading edge of the paper relatively to the printing line, a yielding device tending normally to press said gage toward the platen, and key-controlled means normally restraining said gage from movement toward the platen.

62. In a typewriting machine, the combination with a platen, of a pair of widely separated gage members for squaring the leading edge of the paper relatively to the printing line, yielding devices tending to press said gage members toward the platen, and releasable means for holding said gage members away from the platen.

63. In a typewriting machine and billing mechanism, the combination of a platen, a rotary device that is adapted both to turn with the platen and to allow the platen to turn alone, and stops for arresting said rotary device, one of said stops being connected with the rotary device and being movable thereby into operative contact with the other stop.

64. In a typewriting machine and billing mechanism, the combination of a platen, a rotary device that is adapted both to turn with the platen and to allow the platen to turn alone, stops for arresting said rotary device, one of said stops being connected with the rotary device and being movable thereby into operative contact with the other stop, and means for adjusting one of said stops.

65. In a typewriting machine and billing attachment, the combination of a cylindrical rotary platen, a rotary device adapted both to turn with the platen and to allow the platen to turn alone, and stops for arresting said rotary device, one of said stops being attached to the platen carriage, and the other being connected with the rotary device and being movable thereby into operative contact with the first mentioned stop.

66. In a typewriting machine and in billing mechanism, the combination of a cylindrical platen, line spacing mechanism therefor, and stop devices independent of the line spacing mechanism, one of said stop devices being movable with the platen, and the other being operative while at rest to arrest said movable stop device.

67. In a typewriting machine, the combination of a cylindrical platen, line spacing mechanism therefor, and stop devices independent of the line spacing mechanism, said stop devices comprising a stop that is adapted to rotate with the platen, and a coöperating stop that is normally fastened to the platen carriage and operative while at rest to arrest the rotary stop device.

68. In a typewriting machine, the combination of a cylindrical platen, line spacing mechanism therefor, and independent stop devices comprising a stop that is adapted to turn with the platen and to allow the platen to rotate alone, a coöperating stop that is normally fastened to the platen carriage, and operative while at rest to arrest the other stop device, and means for adjusting one of said stops.

69. In a typewriting machine, the combination of a cylindrical platen, line spacing mechanism therefor, and auxiliary stop devices comprising a stop that is adapted to rotate with the platen and to allow the platen to rotate alone, pawl and ratchet mechanism between said stop and platen, and a coöperating stop that is normally fastened to the platen carriage.

70. In a typewriting machine, the combination of a cylindrical platen, line spacing mechanism therefor, and auxiliary stop devices comprising a stop that is adapted to rotate with the platen and to allow the platen to rotate alone, pawl and ratchet mechanism between said stop and platen, a coöperating stop normally fastened to the platen carriage, and means for adjusting one of said stops.

71. In a typewriting machine, the combination of a cylindrical platen, a stop that is adapted to turn on the axis of rotation of said platen and to turn with the platen and to allow the platen to turn alone, pawl and ratchet mechanism for connecting said stop with the platen, and a coöperating stop arranged to limit the movement of said first mentioned stop.

72. In a typewriting machine, the combination of a cylindrical platen, line spacing mechanism therefor, and stop devices independent of the line spacing mechanism to aid in determining the proper position of the platen to enable writing to be done on any predetermined line on a bill or other sheet.

73. In a typewriting machine, the combination of a platen, line spacing mechanism, and stop devices for use in determining the extent of line feed movement of the platen required to bring any predetermined point on a sheet to the printing line.

74. In a typewriting machine, the combination of a platen, line spacing mechanism, and stop devices independent of said line spacing mechanism for use in determining the extent of line feed movement of the platen required to bring any predetermined point on a sheet to the printing line.

75. In a typewriting machine, the combination of a rotary platen, line spacing mechanism, and stop devices independent of the line spacing mechanism for use in determining the extent of rotary movement of the platen required to bring any predetermined point on a sheet to the printing line.

76. In a typewriting machine, the combination of a rotary platen, a stop adapted to turn with the platen, and a stop normally fastened to the platen frame and coöperative with the first mentioned stop to aid in determining the proper movement to be imparted to the platen in order to bring any desired point on a sheet to the printing line.

77. In a typewriting machine, the combination of a rotary platen, a stop that turns with the platen, a stop adapted to be fastened to the platen frame and to coöperate with the first mentioned stop to aid in determining the proper movement to be imparted to the platen in order to bring any desired point on a sheet to the printing line, and means for adjusting one of said stops.

78. In a typewriting machine, the combination of a platen, a carrier having circularly arranged indices, means for causing said carrier to rotate with the platen and for allowing the platen to rotate independently of the carrier, and stops to limit the rotation of the carrier.

79. In a typewriting machine, the combination of a platen, a carrier having circularly arranged indices, and stop devices which permit the carrier and platen to rotate in one direction and arrest the rotation of the carrier in the opposite direction.

80. In a typewriting machine, the combination of a platen, a carrier having circularly arranged indices, a stop on said carrier, and a coöperating stop on the carriage.

81. In a typewriting machine, the combination of a platen, a carrier having circularly arranged indices thereon, and pawl and ratchet mechanism between said platen and the carrier.

82. In a typewriting machine, the combination of a rotative platen, a carrier which is adapted to rotate with said platen and to allow the platen to rotate independently thereof, two series of line spacing indices arranged in circles on said carrier, and a fixed index device or pointer which coöperates with said indices.

83. In a typewriting machine, the combination of a platen, a line spacing ratchet wheel, a carrier which has two series of circularly arranged line space indices thereon, said indices being spaced apart in substantial accordance with the spacing of the ratchet teeth on the line spacing wheel, a fixed pointer which coöperates with said indices, pawl and ratchet mechanism between the platen and carrier, a stop carried by the carrier, and a coöperating stop.

84. In a typewriting machine, the combination of a platen, a carrier which is adapted to move with and independently of said platen, two series of progressively and circularly arranged indices on said carrier, the indices of each series being situated at line space distances apart and the lowest index of one series of indices beginning one space in advance of the highest index of the other series.

85. In a typewriting machine, the combination of a platen, a carrier which is adapted to move with and independently of the platen, two series of progressively and circularly arranged index numerals on said carrier, the numerals being situated at line space distances apart and those of one series running from 1 to 33 and those of the other series running from 34 to 66, and the index numerals 33 and 66 being adjacent one to the other.

86. In a typewriting machine, the combination of a platen, paper feeding devices, means separate from the paper feeding devices for arresting the paper at a predetermined point, and line indicating means coöperative with the aforesaid means and with the platen to show when a line on the paper, at a desired distance from its leading edge, is at the printing line.

87. In a typewriting machine, the combination of a platen, paper feeding devices, a line indicator carried by said platen, and paper stops against which the leading end of the paper is adapted to abut, the line indicator being coöperative with the platen and said paper stops to show when a line on the paper, at a desired distance from its leading edge, is at the printing line.

88. In a typewriting machine, the combination of a platen, paper feeding devices coöperating therewith, line indicating devices coöperating with said platen, paper stops for arresting the leading end of the paper, and means for throwing the paper stops into operation whenever the paper feeding devices are thrown out of operation.

89. In a typewriting machine, the combination of a platen, paper feed rollers coöperating therewith, line indicating devices connected to and rotating with said platen, paper stops adapted to be interposed in the path of the paper for arresting the leading end thereof, and means for throwing the paper stops into the path of the paper whenever the feed rollers are thrown out of operation.

90. In a typewriting machine, the combination of a platen, line-spacing mechanism, a line indicator which is movable with and independently of the platen, and paper stop devices which are adapted to arrest the leading edge of the paper, said stop devices being adjustable towards and from the printing line through a distance at least equal to the width of a single line space.

91. In a typewriting machine, the combination of a platen, a line index carrier which is adapted to rotate with and independently of said platen, means for arresting the movement of the carrier in one direction and for affording a free movement thereof in the opposite direction, line spacing indices on said carrier, a fixed pointer coöperating therewith, and means for arresting the leading edge of the paper.

92. In a typewriting machine, the combination of a platen, a line index carrier which is adapted to rotate with said platen during a movement thereof in one direction, and to permit an independent movement of the carrier and platen during a movement of the latter in an opposite direction, means for arresting the movement of the carrier in one direction and for affording a free movement thereof in the opposite direction, two series of line spacing indices on said carrier, a fixed pointer coöperating therewith, and means for arresting the leading edge of the paper.

93. In a typewriting machine, the combination of a platen, a line indicator which is carried by the platen and is adapted to remain at rest when the platen is rotated in one direction, a stop carried by said indicator, a coöperating stop, means for adjusting one of said stops, indices carried by said indicator, a fixed pointer coöperating with said indices, and paper stops which are adapted to arrest the leading edge of the paper.

94. In a typewriting machine, the combination with a platen, of a device for pressing paper against the platen, a gage at the platen for squaring the leading edge of the paper relatively to the printing line, said gage being normally out of use, a paper guide curving beneath the platen and having an opening down and up through which said gage may move from and towards the platen, means for releasing said pressure device, and means for throwing said gage up into use independently of said paper guide.

95. In a typewriting machine, the combination with a revoluble platen, of a roller at the receiving side of the platen for pressing the paper against the platen, a gage for the leading edge of the paper between said roller and the printing point on the platen, said gage being normally away from the platen, means for releasing said pressure roller, and means for moving said gage to the platen.

96. In a typewriting machine, the combination with a revoluble platen, of a gage for the leading edge of the paper between the receiving side of the platen and the printing point on the platen, said gage being normally away from the platen, and means for moving said gage to the platen.

97. In a typewriting machine, the combination with a revoluble platen, of forward and rear pressure rollers bearing against the under side of the platen, a gage between said rollers below the platen and normally separated from the latter, said gage being behind the plane containing the printing line and axis of the platen, means for releasing said rear pressure rollers, and means for causing an upward movement of said gage to the platen.

98. In a typewriting machine, the combination with a rotary platen, of a stop movable with the platen around the axis of the platen shaft, a coöperative stop mounted on the axis of the platen shaft and angularly adjustable thereon, and means for fastening the latter stop to the platen frame in different positions.

99. In a typewriting machine comprising a rotary platen, the combination with the platen, of paper gages for facilitating the adjustment of the paper in the machine, said gages being arranged to make contact with 100. In a typewriting machine comprising a rotary platen, the combination with the platen of two paper gages for facilitating the adjustment of the paper in the machine, one of said gages being adapted to make contact with one of the lateral edges of the paper, and the other gage being adapted to make contact with the edge of the paper at one end of the sheet, when the gages are in use.

101. In a typewriting machine comprising a rotary platen, the combination with the platen, of three paper gages for facilitating the adjustment of the paper in the machine, two of said gages being adapted to make contact with the lateral edges of the paper, and the other gage being adapted to make contact with the edge of the paper at one end of the sheet, when the gages are in use.

102. In a typewriting machine comprising a rotary platen, the combination with the platen, of two paper gages for facilitating the adjustment of the paper in the machine, the faces of said gages being in planes which cut each other at right angles.

103. In a typewriting machine comprising a rotary platen, the combination with the platen, of paper gages for facilitating the adjustment of the paper in the machine, the face of one of said gages being at right angles to the axis of the platen, and one of said gages extending lengthwise of the platen.

104. In a typewriting machine comprising a rotary platen, the combination with the platen, of three paper gages for facilitating the adjustment of the paper in the machine, the faces of two of said gages being parallel and at right angles to the axis of the platen, and the other of said gages extending lengthwise of the platen.

105. In a typewriting machine, the combination of a rotary platen, a rotary indicating device, means operatively connecting said device with said platen to cause said device to turn with said platen, means for disconnecting said device and platen, and means operating automatically to effect a relative rotary movement between said device and said platen.

106. In a typewriting machine, the combination of a rotary platen, a rotary indicating device, means for operatively connecting said device with said platen to cause said device to turn with said platen, means for disconnecting said device from the platen, and a spring operating automatically to turn said indicating device independently of said platen.

107. In a typewriting machine, the combination of a rotary platen, a rotary indicating device, means operatively connecting said device with said platen to cause said device to turn with said platen, means for disconnecting said device and platen, means operating automatically to effect a relative rotary movement between said device and said platen, and a stationary pointer coöperative with said indicating device to indicate the writing line on the platen.

108. In a typewriting machine, the combination of a rotary platen, a rotary indicating device, means for operatively connecting said device with said platen to cause said device to turn with said platen, means for disconnecting said device from the platen, a spring operating automatically to turn said indicating device independently of said platen, and a stationary pointer coöperative with said indicating device to indicate the writing line on the platen.

109. In a typewriting machine, the combination of a rotary platen, a rotary indicating device, a two-part clutch for connecting said device with said platen so as to cause said device to turn when the platen is turned, hand-operated means for disconnecting the parts of said clutch, and a spring operating automatically to turn said indicating device relatively to said platen.

110. In a typewriting machine, the combination of a rotary platen, a rotary indicating device, a two-part clutch for connecting said device with said platen so as to cause said device to turn when the platen is turned, hand-operated means for disconnecting said clutch, a spring operating automatically to turn said indicating device relatively to said platen, and a stationary pointer coöperative with said indicating device to indicate the writing line on the platen.

111. In a typewriting machine, the combination of a rotary platen, a rotary indicating device mounted on the axle of said platen and adapted to turn freely thereon, a clutch normally operative to connect said indicating device with said platen to cause said indicating device to be turned when said platen is turned, hand actuated means operative at will to unclutch said clutch, and a spring operating to turn said indicating device on the platen axle when the clutch is unclutched.

112. In a typewriting machine, the combination of a rotary platen, a rotary indicating device mounted on the axle of said platen and adapted to turn freely thereon, a clutch normally operative to connect said indicating device with said platen to cause said indicating device to be turned when said platen is turned, hand actuated means operative at will to unclutch said clutch, a spring operating to turn said indicating device on the platen axle when the clutch is unclutched, and a stationary pointer coöperative with said indicating device to indicate the writing line on the platen.

113. In a typewriting machine, the combination of a rotary platen, a rotary indicating device, means normally connecting said indicating device with said platen, means for disconnecting said indicating device from said platen, and a spring device operative to turn said indicating device relatively to said platen, said spring device comprising a casing, a friction band engaging the inner surface of said casing, and a coiled spring within said casing and connected at one end to the friction band.

114. In a typewriting machine, the combination of a rotary platen, an indicating device connected with said platen, means for causing said indicating device to turn with said platen when said platen is turned in one direction but adapted to permit of the platen turning in the other direction without turning said indicating device, and a spring tending to turn said indicating device in the last mentioned direction.

115. In a typewriting machine, the combination of a rotary platen, an indicating device connected with said platen, means for causing said indicating device to turn with said platen when said platen is turned in one direction but adapted to permit of the platen turning in the other direction without turning said indicating device, a spring tending to turn said indicating device in the last mentioned direction, and a friction device to prevent overwinding of said spring.

116. In a typewriting machine, the combination of a rotary platen, an indicating device connected with said platen so as to turn with said platen to any desired extent in one direction, and a stop for arresting said indicating device when it is turned in the opposite direction.

117. In a typewriting machine, the combination of a rotary platen, an indicating device, means for causing said indicating device to rotate with said platen, and automatic means for restoring said indicating device to initial position independently of said platen.

118. In a typewriting machine, the combination of a rotary platen, an indicating device, means for causing said indicating device to rotate with said platen, and a spring for restoring said indicating device to initial position independently of said platen.

119. In a typewriting machine, the combination of paper feeding means, a line indicator, means for moving said line indicator with or independently of said paper feeding means, and a stop for arresting said line indicator in initial position.

120. In a typewriting machine, the combination with a rotary platen, of a line indicator, a releasable clutch connection between said platen and indicator, and means including a lever for holding said clutch connection in its released position.

121. In a typewriting machine, the combination of a rotary platen, an axle for said platen, a line indicator mounted on said axle, a releasable clutch connection between said axle and said indicator, and a spring for restoring said indicator to initial position when said clutch connection is released.

122. In a typewriting machine, the combination of a rotary platen, an axle for said platen, a line indicator mounted on said axle, a releasable clutch connection between said axle and said indicator, a spring for restoring said indicator to initial position when said clutch connection is released, and a stop for arresting said indicator in initial position.

123. In a typewriting machine, the combination with a platen, of line spacing mechanism, devices coöperative with the platen and said line spacing mechanism to feed the paper by line space distances, a stop with which an edge of the paper is brought into contact at points on a line parallel to the axis of the platen when the paper is adjusted in the machine, and means bearing definite relations to the line spacing mechanism and said stop, and arranged to be actuated when the platen is turned, and thus adapted to show when said edge of the paper has traveled a predetermined number of line spaces from said line.

124. In a typewriting machine, the combination with the platen, of line spacing mechanism, feed rolls coöperative with the platen and said line spacing mechanism to feed the paper by line space distances, a stop with which an edge of the paper is brought into contact at points on a line parallel to the axis of the platen when the paper is adjusted in the machine, and means bearing definite relations to the line spacing mechanism and said stop, and arranged to be actuated when the platen is turned, and thus adapted to show when said edge of the paper has traveled a predetermined number of line spaces from said line.

125. In a typewriting machine, the combination with the platen, of line spacing mechanism, devices coöperative with the platen and said line spacing mechanism to feed the paper by line space distances, a stop with which an edge of the paper is brought into contact at points on a line parallel to the axis of the platen when the paper is adjusted in the machine, and means adapted to show when said edge of the paper has traveled a predetermined number of line spaces from said line, said means including a rotary device bearing definite relations to the line spacing mechanism and said stop, and arranged to be actuated when the platen is turned.

126. In a typewriting machine, the combination with the platen, of line spacing mechanism, feed rolls coöperative with the platen and said line spacing mechanism to feed the paper by line space distances, a stop with which an edge of the paper is brought into contact at points on a line parallel to the axis of the platen when the paper is adjusted in the machine, and means adapted to show when said edge of the paper has traveled a predetermined number of line spaces from said line, said means including a rotary device bearing definite relations to the line spacing mechanism and said stop, and arranged to be actuated when the platen is turned.

127. In a typewriting machine, the combination with the platen, of line spacing mechanism, devices coöperative with the platen and said line spacing mechanism to feed the paper by line space distances, a stop with which an edge of the paper is brought into contact at points on a line parallel to the axis of the platen when the paper is adjusted in the machine, and a rotary scale mounted on the platen axle and bearing definite relations to the line spacing mechanism and said stop, and arranged to be actuated when the platen is turned, and thus adapted to show when said edge of the paper has traveled a predetermined number of line spaces from said line.

128. In a typewriting machine, the combination with the platen, of line spacing mechanism, feed rolls coöperative with the platen and said line spacing mechanism to feed the paper by line space distances, a stop with which an edge of the paper is brought into contact at points on a line parallel to the axis of the platen when the paper is adjusted in the machine, and a rotary scale mounted on the platen axle and bearing definite relations to the line spacing mechanism and said stop, and arranged to be actuated when the platen is turned, and thus adapted to show when said edge of the paper has traveled a predetermined number of line spaces from said line.

129. In a typewriting machine, the combination of a platen carriage, a platen thereon, a support on said platen carriage, a slide adjustable on said support, and a paper stop pivotally connected to said slide.

130. In a typewriting machine, the combination of a platen carriage, a platen thereon, a support on said platen carriage, a slide adjustable on said support, a stop carrier pivotally connected to said slide, and a device carried by said carrier and forming therewith a paper-stop.

131. In a typewriting machine, the combination of a platen carriage, a platen thereon, a pair of supports on said platen carriage, slides adjustable on said supports, a stop carrier pivoted on said slides, and devices carried by said carrier and forming therewith a paper stop.

132. In a typewriting machine, the combination of a platen carriage, a platen thereon, a pair of supports on said platen carriage, slides adjustable on said supports, a stop carrier having arms pivoted on said slides, and devices carried by said carrier and forming therewith a paper stop.

STEPHEN H. FARNHAM.

Witnesses:
THOMAS A. BANNING,
OSCAR W. BOND.